(12) United States Patent
Hirahata et al.

(10) Patent No.: US 8,236,908 B2
(45) Date of Patent: Aug. 7, 2012

(54) COMPONENTS AND CATALYSTS FOR THE POLYMERIZATION OF OLEFINS

(75) Inventors: Wataru Hirahata, Sodegaura (JP); Hidenori Hanaoka, Suita (JP); Masaya Tanimoto, Toyonaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/080,278

(22) Filed: Apr. 5, 2011

(65) Prior Publication Data
US 2011/0269927 A1  Nov. 3, 2011

(30) Foreign Application Priority Data
Apr. 28, 2010 (JP) ................. 2010-104105

(51) Int. Cl.
*C08F 4/50* (2006.01)
*C08F 110/06* (2006.01)

(52) U.S. Cl. ............. 526/124.3; 526/348; 526/351; 526/943

(58) Field of Classification Search ............ 526/124.3, 526/348, 351, 943
See application file for complete search history.

(56) References Cited

U.S. PATENT DOCUMENTS
2008/0097050 A1* 4/2008 Matsunaga et al. ........ 526/124.1

FOREIGN PATENT DOCUMENTS
JP  2001114811 A  4/2001
JP  2003040918 A  2/2003

* cited by examiner

*Primary Examiner* — Rebecca Anderson
*Assistant Examiner* — Sonya Wright
(74) *Attorney, Agent, or Firm* — Panitch Schwarze Belisario & Nadel LLP

(57) ABSTRACT

A solid catalyst component for olefin polymerization comprising a titanium atom, a magnesium atom, a halogen atom, and a cycloheptapolyenedicarboxylic diester; a production method of the solid catalyst component, by contacting with one another a titanium compound, a magnesium compound, and the cycloheptapolyenedicarboxylic diester; a production method of a solid catalyst, by contacting the solid catalyst component with an organoaluminum compound; and a production method of an olefin polymer by polymerizing an olefin in the presence of the solid catalyst.

19 Claims, No Drawings

COMPONENTS AND CATALYSTS FOR THE POLYMERIZATION OF OLEFINS

FIELD OF THE INVENTION

The present invention relates to (1) a solid catalyst component for olefin polymerization, (2) a process for producing a solid catalyst component for olefin polymerization, (3) a process for producing a solid catalyst for olefin polymerization, and (4) a process for producing an olefin polymer.

BACKGROUND OF THE INVENTION

It is known in the art that an internal electron donor has a great impact to a performance of a catalyst component for olefin polymerization. It is also known to use an alicyclic dicarboxylic diester as an internal electron donor.

For example, JP2003-40918A discloses a solid catalyst component for olefin polymerization prepared by contacting with one another a magnesium compound, titanium tetrachloride, and a cyclohexenedicarboxlic diester; JP2001-114811A discloses a solid catalyst component for olefin polymerization obtained by contacting with one another a titanium compound, a magnesium compound, and a 1,2-cyclohexanedicarboxlic diester having a trans purity of 20% or more; and WO2006-077945 (corresponding to US2008/0097050A) discloses a solid catalyst component for olefin polymerization containing a titanium atom, a magnesium atom, a halogen atom, and a alicyclic and unsaturated alicyclic dicarboxylic diester having five to ten-membered ring structure.

SUMMARY OF THE INVENTION

However, the above solid catalyst components do not give a catalyst for olefin polymerization having a satisfactory polymerization activity. An object of the present invention is to provide (1) a solid catalyst component for olefin polymerization which shows a sufficiently-high polymerization activity, (2) a process for producing such a solid catalyst component for olefin polymerization, (3) a process for producing a solid catalyst for olefin polymerization, and (4) a process for producing an olefin polymer.

The present invention is a solid catalyst component for olefin polymerization comprising a titanium atom, a magnesium atom, a halogen atom, and a cycloheptapolyenedicarboxylic diester.

Also, the present invention is a process for producing the above solid catalyst component, comprising a step of contacting with one another a titanium compound, a magnesium compound, and a cycloheptapolyenedicarboxylic diester. This production process is hereinafter referred to as "catalyst component production process (1)".

Further, the present invention is a process for producing the above solid catalyst component, comprising a step of contacting a solid component comprising a titanium atom and a magnesium atom with a cycloheptapolyenedicarboxylic diester. This production process is hereinafter referred to as "catalyst component production process (2)".

Still further, the present invention is a process for producing a solid catalyst for olefin polymerization, comprising a step of contacting with one another the above solid catalyst component, an organoaluminum compound, and an optional external electron donor.

Moreover, the present invention is a process for producing a solid catalyst for olefin polymerization, comprising a step of contacting with one another a solid catalyst component produced by above catalyst component production process (1), an organoaluminum compound, and an optional external electron donor.

Also, the present invention is a process for producing a solid catalyst for olefin polymerization, comprising a step of contacting with one another a solid catalyst component produced by above catalyst component production process (2), an organoaluminum compound, and an optional external electron donor.

Also, the present invention is a process for producing an olefin polymer, comprising a step of polymerizing an olefin in the presence of a solid catalyst produced by any one of the above three production processes. The above solid catalyst component for olefin polymerization is simply referred to hereinafter as "solid catalyst component".

DETAILED DESCRIPTION OF THE INVENTION

While the cycloheptapolyenedicarboxylic diester contains two hydrocarbyloxycarbonyl groups, it is preferable that each of those two hydrocarbyloxycarbonyl groups links to each of vicinal two carbon atoms constituting a cyclic carbon skeleton of the cycloheptapolyenedicarboxylic diester; it is more preferable that one or two carbon atoms, each of which links to each of those two hydrocarbyloxycarbonyl groups, constitute a carbon-to-carbon double bond; it is further preferable that plural carbon-to-carbon double bonds contained in the cyclic carbon skeleton of the cycloheptapolyenedicarboxylic diester conjugate mutually; it is particularly preferable that the cycloheptapolyenedicarboxylic diester is a compound represented by following formula (I), (II), (III), (IV), (V) or (VI), or a combination of two or more of those compounds; and it is most preferable that the cycloheptapolyenedicarboxylic diester is a compound represented by formula (I), (IV), (V) or (VI), or a combination of two or more thereof:

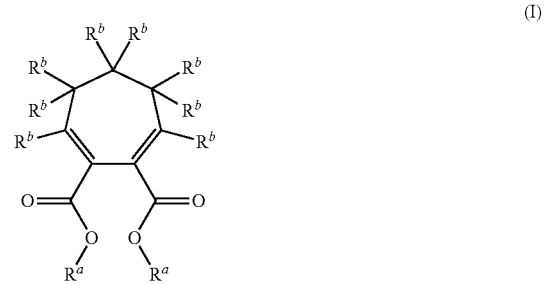

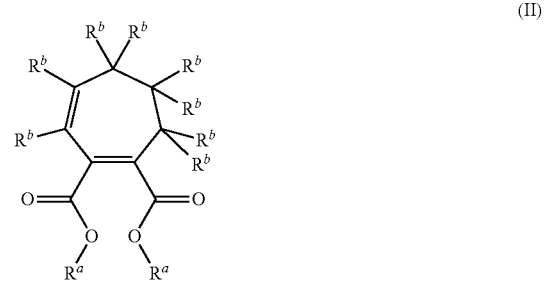

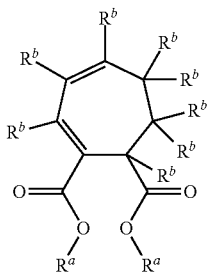
(III)

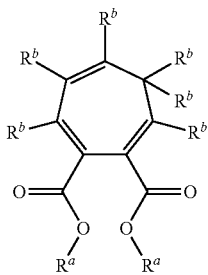
(IV)

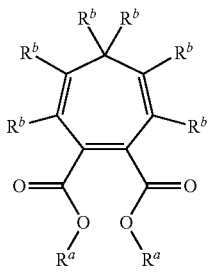
(V)

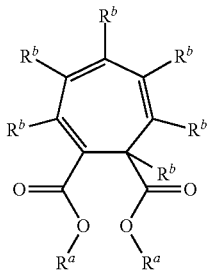
(VI)

wherein $R^a$ is a hydrocarbyl group having 1 to 20 carbon atoms, and respective two $R^a$s are the same as, or different from each other; and $R^b$ is a hydrogen atom, a halogen atom, or a hydrocarbyl group having 1 to 20 carbon atoms, and respective plural $R^b$s are the same as, or different from one another.

Examples of the hydrocarbyl group of $R^a$ are an alkyl group, an aralky group, an aryl group and an alkenyly group. Those groups may be substituted by a substituent such as a halogen atom, a hydrocarbyloxy group, a nitro group, a sulfonyl group, and a silyl group.

Examples of the above alkyl group are a linear alkyl group such as a methyl group, an ethyl group, a n-propyl group, a n-butyl group, a n-pentyl group, a n-hexyl group, a n-heptyl group, and a n-octyl group; a branched alkyl group such as an isopropyl group, an isobutyl group, a tert-butyl group, an isopentyl group, a neopentyl group, and a 2-ethylhexyl group; and a cycloalkyl group such as a cyclopropyl group, a cyclobutyl group, a cyclopentyl group, a cyclohexyl group, a cycloheptyl group, and a cyclooctyl group. Among them, preferred is a linear, branched or cycloalkyl group having 1 to 20 carbon atoms; and more preferred is a linear or branched alkyl group having 1 to 10 carbon atoms.

Examples of the above aralkyl group are a benzyl group and a phenethyl group. Among them, preferred is an aralkyl group having 7 to 10 carbon atoms.

Examples of the above aryl group are a pheny group, a tolyl group and a xylyl group. Among them, preferred is an aryl group having 6 to 20 carbon atoms.

Examples of the above alkenyl group are a linear alkenyl group such as a vinyl group, an allyl group, a 3-butenyl group, and a 5-hexenyl group; a branched alkenyl group such as an isobutenyl group and a 5-methyl-3-pentenyl group; and a cycloalkenyl group such as a 2-cyclohexenyl group and a 3-cyclohexenyl group. Among them, preferred is an alkenyl group having 2 to 10 carbon atoms.

$R^a$ is preferably an alkyl group having 1 to 10 carbon atoms, more preferably a linear or branched alkyl group having 1 to 10 carbon atoms, and particularly preferably a methyl group, an ethyl group, a n-propyl group, a n-butyl group, a n-pentyl group, a n-hexyl group, a n-heptyl group, a n-octyl group, an isopropyl group, an isobutyl group, a tert-butyl group, an isopentyl group, a neopentyl group, or a 2-ethylhexyl group.

Examples of the above halogen atom of $R^b$ are a fluorine atom, a chlorine atom, a bromine atom, and an iodine atom. Among them, preferred is a fluorine atom, a chlorine atom, or a bromine atom, and more preferred is a fluorine atom.

Examples of the hydrocarbyl group of $R^b$ are an alkyl group, an aralky group, an aryl group and an alkenyly group. Those groups may be substituted by a substituent such as a halogen atom, a hydrocarbyloxy group, a nitro group, a sulfonyl group, and a silyl group.

Examples of the above alkyl group are a linear alkyl group such as a methyl group, an ethyl group, a n-propyl group, a n-butyl group, a n-pentyl group, a n-hexyl group, a n-heptyl group, and a n-octyl group; a branched alkyl group such as an isopropyl group, an isobutyl group, a tert-butyl group, an isopentyl group, a neopentyl group, and a 2-ethylhexyl group; and a cycloalkyl group such as a cyclopropyl group, a cyclobutyl group, a cyclopentyl group, a cyclohexyl group, a cycloheptyl group, and a cyclooctyl group. Among them, preferred is a linear, branched or cycloalkyl group having 1 to 20 carbon atoms; and more preferred is a linear or branched alkyl group having 1 to 10 carbon atoms.

Examples of the above aralkyl group are a benzyl group and a phenethyl group. Among them, preferred is an aralkyl group having 7 to 10 carbon atoms.

Examples of the above aryl group are a pheny group, a tolyl group and a xylyl group. Among them, preferred is an aryl group having 6 to 20 carbon atoms.

Examples of the above alkenyl group are a linear alkenyl group such as a vinyl group, an allyl group, 3-butenyl group, and a 5-hexenyl group; a branched alkenyl group such as an isobutenyl group and a 5-methyl-3-pentenyl group; and a cycloalkenyl group such as 2-cyclohexenyl group and a 3-cyclohexenyl group. Among them, preferred is an alkenyl group having 2 to 10 carbon atoms.

$R^b$ is preferably a hydrogen atom or an alkyl group having 1 to 10 carbon atoms; more preferably a hydrogen atom, or a linear or branched alkyl group having 1 to 10 carbon atoms; and particularly preferably a hydrogen atom, a methyl group, an ethyl group, a n-propyl group, a n-butyl group, a n-pentyl group, a n-hexyl group, a n-heptyl group, a n-octyl group, an isopropyl group, an isobutyl group, a tert-butyl group, an isopentyl group, a neopentyl group, or a 2-ethylhexyl group.

Specific examples of the cycloheptapolyenedicarboxylic diester are as follows:

Cyclohepta-2,7-diene-1,2-dicarboxylic diester
Represented by Formula (I)

dimethyl cyclohepta-2,7-diene-1,2-dicarboxylate,
diethyl cyclohepta-2,7-diene-1,2-dicarboxylate,
di-n-propyl cyclohepta-2,7-diene-1,2-dicarboxylate,
di-n-butyl cyclohepta-2,7-diene-1,2-dicarboxylate,
di-n-pentyl cyclohepta-2,7-diene-1,2-dicarboxylate,
di-n-hexyl cyclohepta-2,7-diene-1,2-dicarboxylate,
diisopropyl cyclohepta-2,7-diene-1,2-dicarboxylate,
diisobutyl cyclohepta-2,7-diene-1,2-dicarboxylate,
di(2-ethylhexyl)cyclohepta-2,7-diene-1,2-dicarboxylate,
dimethyl 4-methylcyclohepta-2,7-diene-1,2-dicarboxylate,
diethyl 4-methylcyclohepta-2,7-diene-1,2-dicarboxylate,
di-n-propyl 4-methylcyclohepta-2,7-diene-1,2-dicarboxylate,
di-n-butyl 4-methylcyclohepta-2,7-diene-1,2-dicarboxylate,
di-n-pentyl 4-methylcyclohepta-2,7-diene-1,2-dicarboxylate,
di-n-hexyl 4-methylcyclohepta-2,7-diene-1,2-dicarboxylate,
diisopropyl 4-methylcyclohepta-2,7-diene-1,2-dicarboxylate,
diisobutyl 4-methylcyclohepta-2,7-diene-1,2-dicarboxylate,
di(2-ethylhexyl) 4-methylcyclohepta-2,7-diene-1,2-dicarboxylate,
dimethyl 5-methylcyclohepta-2,7-diene-1,2-dicarboxylate,
diethyl 5-methylcyclohepta-2,7-diene-1,2-dicarboxylate,
di-n-propyl 5-methylcyclohepta-2,7-diene-1,2-dicarboxylate,
di-n-butyl 5-methylcyclohepta-2,7-diene-1,2-dicarboxylate,
di-n-pentyl 5-methylcyclohepta-2,7-diene-1,2-dicarboxylate,
di-n-hexyl 5-methylcyclohepta-2,7-diene-1,2-dicarboxylate,
diisopropyl 5-methylcyclohepta-2,7-diene-1,2-dicarboxylate,
diisobutyl 5-methylcyclohepta-2,7-diene-1,2-dicarboxylate,
di(2-ethylhexyl) 5-methylcyclohepta-2,7-diene-1,2-dicarboxylate,
dimethyl 5,5-dimethylcyclohepta-2,7-diene-1,2-dicarboxylate,
diethyl 5,5-dimethylcyclohepta-2,7-diene-1,2-dicarboxylate,
di-n-propyl 5,5-dimethylcyclohepta-2,7-diene-1,2-dicarboxylate,
di-n-butyl 5,5-dimethylcyclohepta-2,7-diene-1,2-dicarboxylate,
di-n-pentyl 5,5-dimethylcyclohepta-2,7-diene-1,2-dicarboxylate,
di-n-hexyl 5,5-dimethylcyclohepta-2,7-diene-1,2-dicarboxylate,
diisopropyl 5,5-dimethylcyclohepta-2,7-diene-1,2-dicarboxylate,
diisobutyl 5,5-dimethylcyclohepta-2,7-diene-1,2-dicarboxylate,
di(2-ethylhexyl) 5,5-dimethylcyclohepta-2,7-diene-1,2-dicarboxylate,
dimethyl 4,6-dimethylcyclohepta-2,7-diene-1,2-dicarboxylate,
diethyl 4,6-dimethylcyclohepta-2,7-diene-1,2-dicarboxylate,
di-n-propyl 4,6-dimethylcyclohepta-2,7-diene-1,2-dicarboxylate,
di-n-butyl 4,6-dimethylcyclohepta-2,7-diene-1,2-dicarboxylate,
di-n-pentyl 4,6-dimethylcyclohepta-2,7-diene-1,2-dicarboxylate,
di-n-hexyl 4,6-dimethylcyclohepta-2,7-diene-1,2-dicarboxylate,
diisopropyl 4,6-dimethylcyclohepta-2,7-diene-1,2-dicarboxylate,
diisobutyl 4,6-dimethylcyclohepta-2,7-diene-1,2-dicarboxylate, and
di(2-ethylhexyl) 4,6-dimethylcyclohepta-2,7-diene-1,2-dicarboxylate.

Cyclohepta-1,3-diene-1,2-dicarboxylic diester
Represented by Formula (II)

dimethyl cyclohepta-1,3-diene-1,2-dicarboxylate,
diethyl cyclohepta-1,3-diene-1,2-dicarboxylate,
di-n-propyl cyclohepta-1,3-diene-1,2-dicarboxylate,
di-n-butyl cyclohepta-1,3-diene-1,2-dicarboxylate,
di-n-pentyl cyclohepta-1,3-diene-1,2-dicarboxylate,
di-n-hexyl cyclohepta-1,3-diene-1,2-dicarboxylate,
diisopropyl cyclohepta-1,3-diene-1,2-dicarboxylate,
diisobutyl cyclohepta-1,3-diene-1,2-dicarboxylate,
di(2-ethylhexyl)cyclohepta-1,3-diene-1,2-dicarboxylate,
dimethyl 4-methylcyclohepta-1,3-diene-1,2-dicarboxylate,
diethyl 4-methylcyclohepta-1,3-diene-1,2-dicarboxylate,
di-n-propyl 4-methylcyclohepta-1,3-diene-1,2-dicarboxylate,
di-n-butyl 4-methylcyclohepta-1,3-diene-1,2-dicarboxylate,
di-n-pentyl 4-methylcyclohepta-1,3-diene-1,2-dicarboxylate,
di-n-hexyl 4-methylcyclohepta-1,3-diene-1,2-dicarboxylate,
diisopropyl 4-methylcyclohepta-1,3-diene-1,2-dicarboxylate,
diisobutyl 4-methylcyclohepta-1,3-diene-1,2-dicarboxylate,
di(2-ethylhexyl) 4-methylcyclohepta-1,3-diene-1,2-dicarboxylate,
dimethyl 5-methylcyclohepta-1,3-diene-1,2-dicarboxylate,
diethyl 5-methylcyclohepta-1,3-diene-1,2-dicarboxylate,
di-n-propyl 5-methylcyclohepta-1,3-diene-1,2-dicarboxylate,
di-n-butyl 5-methylcyclohepta-1,3-diene-1,2-dicarboxylate,
di-n-pentyl 5-methylcyclohepta-1,3-diene-1,2-dicarboxylate,
di-n-hexyl 5-methylcyclohepta-1,3-diene-1,2-dicarboxylate,
diisopropyl 5-methylcyclohepta-1,3-diene-1,2-dicarboxylate,
diisobutyl 5-methylcyclohepta-1,3-diene-1,2-dicarboxylate,
di(2-ethylhexyl) 5-methylcyclohepta-1,3-diene-1,2-dicarboxylate,
dimethyl 6-methylcyclohepta-1,3-diene-1,2-dicarboxylate,
diethyl 6-methylcyclohepta-1,3-diene-1,2-dicarboxylate,
di-n-propyl 6-methylcyclohepta-1,3-diene-1,2-dicarboxylate,
di-n-butyl 6-methylcyclohepta-1,3-diene-1,2-dicarboxylate,
di-n-pentyl 6-methylcyclohepta-1,3-diene-1,2-dicarboxylate,
di-n-hexyl 6-methylcyclohepta-1,3-diene-1,2-dicarboxylate,
diisopropyl 6-methylcyclohepta-1,3-diene-1,2-dicarboxylate,
diisobutyl 6-methylcyclohepta-1,3-diene-1,2-dicarboxylate,
di(2-ethylhexyl) 6-methylcyclohepta-1,3-diene-1,2-dicarboxylate,
dimethyl 5,5-dimethylcyclohepta-1,3-diene-1,2-dicarboxylate,
diethyl 5,5-dimethylcyclohepta-1,3-diene-1,2-dicarboxylate, di-n-propyl 5,5-dimethylcyclohepta-1,3-diene-1,2-dicarboxylate,
di-n-butyl 5,5-dimethylcyclohepta-1,3-diene-1,2-dicarboxylate,
di-n-pentyl 5,5-dimethylcyclohepta-1,3-diene-1,2-dicarboxylate,
di-n-hexyl 5,5-dimethylcyclohepta-1,3-diene-1,2-dicarboxylate,
diisopropyl 5,5-dimethylcyclohepta-1,3-diene-1,2-dicarboxylate,
diisobutyl 5,5-dimethylcyclohepta-1,3-diene-1,2-dicarboxylate,
di(2-ethylhexyl) 5,5-dimethylcyclohepta-1,3-diene-1,2-dicarboxylate,
dimethyl 5,6-dimethylcyclohepta-1,3-diene-1,2-dicarboxylate,
diethyl 5,6-dimethylcyclohepta-1,3-diene-1,2-dicarboxylate,
di-n-propyl 5,6-dimethylcyclohepta-1,3-diene-1,2-dicarboxylate,
di-n-butyl 5,6-dimethylcyclohepta-1,3-diene-1,2-dicarboxylate,
di-n-pentyl 5,6-dimethylcyclohepta-1,3-diene-1,2-dicarboxylate,
di-n-hexyl 5,6-dimethylcyclohepta-1,3-diene-1,2-dicarboxylate,
diisopropyl 5,6-dimethylcyclohepta-1,3-diene-1,2-dicarboxylate,
diisobutyl 5,6-dimethylcyclohepta-1,3-diene-1,2-dicarboxylate, and
di(2-ethylhexyl) 5,6-dimethylcyclohepta-1,3-diene-1,2-dicarboxylate.

Cyclohepta-2,4-diene-1,2-dicarboxylicdiester Represented by Formula (III)

dimethyl cyclohepta-2,4-diene-1,2-dicarboxylate,
diethyl cyclohepta-2,4-diene-1,2-dicarboxylate,
di-n-propyl cyclohepta-2,4-diene-1,2-dicarboxylate,
di-n-butyl cyclohepta-2,4-diene-1,2-dicarboxylate,
di-n-pentyl cyclohepta-2,4-diene-1,2-dicarboxylate,
di-n-hexyl cyclohepta-2,4-diene-1,2-dicarboxylate,
diisopropyl cyclohepta-2,4-diene-1,2-dicarboxylate,
diisobutyl cyclohepta-2,4-diene-1,2-dicarboxylate,
di(2-ethylhexyl)cyclohepta-2,4-diene-1,2-dicarboxylate,
dimethyl 4-methylcyclohepta-2,4-diene-1,2-dicarboxylate,
diethyl 4-methylcyclohepta-2,4-diene-1,2-dicarboxylate,
di-n-propyl 4-methylcyclohepta-2,4-diene-1,2-dicarboxylate,
di-n-butyl 4-methylcyclohepta-2,4-diene-1,2-dicarboxylate,
di-n-pentyl 4-methylcyclohepta-2,4-diene-1,2-dicarboxylate,
di-n-hexyl 4-methylcyclohepta-2,4-diene-1,2-dicarboxylate,
diisopropyl 4-methylcyclohepta-2,4-diene-1,2-dicarboxylate,
diisobutyl 4-methylcyclohepta-2,4-diene-1,2-dicarboxylate,
di(2-ethylhexyl) 4-methylcyclohepta-2,4-diene-1,2-dicarboxylate,
dimethyl 5-methylcyclohepta-2,4-diene-1,2-dicarboxylate,
diethyl 5-methylcyclohepta-2,4-diene-1,2-dicarboxylate,
di-n-propyl 5-methylcyclohepta-2,4-diene-1,2-dicarboxylate,
di-n-butyl 5-methylcyclohepta-2,4-diene-1,2-dicarboxylate,
di-n-pentyl 5-methylcyclohepta-2,4-diene-1,2-dicarboxylate,
di-n-hexyl 5-methylcyclohepta-2,4-diene-1,2-dicarboxylate,
diisopropyl 5-methylcyclohepta-2,4-diene-1,2-dicarboxylate,
diisobutyl 5-methylcyclohepta-2,4-diene-1,2-dicarboxylate,
di(2-ethylhexyl) 5-methylcyclohepta-2,4-diene-1,2-dicarboxylate,
dimethyl 6-methylcyclohepta-2,4-diene-1,2-dicarboxylate,
diethyl 6-methylcyclohepta-2,4-diene-1,2-dicarboxylate,
di-n-propyl 6-methylcyclohepta-2,4-diene-1,2-dicarboxylate,
di-n-butyl 6-methylcyclohepta-2,4-diene-1,2-dicarboxylate,
di-n-pentyl 6-methylcyclohepta-2,4-diene-1,2-dicarboxylate,
di-n-hexyl 6-methylcyclohepta-2,4-diene-1,2-dicarboxylate,
diisopropyl 6-methylcyclohepta-2,4-diene-1,2-dicarboxylate,
diisobutyl 6-methylcyclohepta-2,4-diene-1,2-dicarboxylate,
di(2-ethylhexyl) 6-methylcyclohepta-2,4-diene-1,2-dicarboxylate,
dimethyl 6,6-methylcyclohepta-2,4-diene-1,2-dicarboxylate,
diethyl 6,6-methylcyclohepta-2,4-diene-1,2-dicarboxylate,
di-n-propyl 6,6-methylcyclohepta-2,4-diene-1,2-dicarboxylate,
di-n-butyl 6,6-methylcyclohepta-2,4-diene-1,2-dicarboxylate,
di-n-pentyl 6,6-methylcyclohepta-2,4-diene-1,2-dicarboxylate,
di-n-hexyl 6,6-methylcyclohepta-2,4-diene-1,2-dicarboxylate,
diisopropyl 6,6-methylcyclohepta-2,4-diene-1,2-dicarboxylate,
diisobutyl 6,6-methylcyclohepta-2,4-diene-1,2-dicarboxylate, and
di(2-ethylhexyl) 6,6-methylcyclohepta-2,4-diene-1,2-dicarboxylate.

Cyclohepta-2,4,7-triene-1,2-dicarboxylic diester Represented by Formula (IV)

dimethyl cyclohepta-2,4,7-triene-1,2-dicarboxylate,
diethyl cyclohepta-2,4,7-triene-1,2-dicarboxylate,
di-n-propyl cyclohepta-2,4,7-triene-1,2-dicarboxylate,
di-n-butyl cyclohepta-2,4,7-triene-1,2-dicarboxylate,
di-n-pentyl cyclohepta-2,4,7-triene-1,2-dicarboxylate,
di-n-hexyl cyclohepta-2,4,7-triene-1,2-dicarboxylate,
diisopropyl cyclohepta-2,4,7-triene-1,2-dicarboxylate,
diisobutyl cyclohepta-2,4,7-triene-1,2-dicarboxylate,
di(2-ethylhexyl)cyclohepta-2,4,7-triene-1,2-dicarboxylate,
dimethyl 4-methylcyclohepta-2,4,7-triene-1,2-dicarboxylate,
diethyl 4-methylcyclohepta-2,4,7-triene-1,2-dicarboxylate,
di-n-propyl 4-methylcyclohepta-2,4,7-triene-1,2-dicarboxylate,
di-n-butyl 4-methylcyclohepta-2,4,7-triene-1,2-dicarboxylate,
di-n-pentyl 4-methylcyclohepta-2,4,7-triene-1,2-dicarboxylate,
di-n-hexyl 4-methylcyclohepta-2,4,7-triene-1,2-dicarboxylate,
diisopropyl 4-methylcyclohepta-2,4,7-triene-1,2-dicarboxylate,
diisobutyl 4-methylcyclohepta-2,4,7-triene-1,2-dicarboxylate,
di(2-ethylhexyl) 4-methylcyclohepta-2,4,7-triene-1,2-dicarboxylate,
dimethyl 5-methylcyclohepta-2,4,7-triene-1,2-dicarboxylate, diethyl 5-methylcyclohepta-2,4,7-triene-1,2-dicarboxylate,
di-n-propyl 5-methylcyclohepta-2,4,7-triene-1,2-dicarboxylate,
di-n-butyl 5-methylcyclohepta-2,4,7-triene-1,2-dicarboxylate,
di-n-pentyl 5-methylcyclohepta-2,4,7-triene-1,2-dicarboxylate,
di-n-hexyl 5-methylcyclohepta-2,4,7-triene-1,2-dicarboxylate,
diisopropyl 5-methylcyclohepta-2,4,7-triene-1,2-dicarboxylate,
diisobutyl 5-methylcyclohepta-2,4,7-triene-1,2-dicarboxylate,
di(2-ethylhexyl) 5-methylcyclohepta-2,4,7-triene-1,2-dicarboxylate,
dimethyl 6-methylcyclohepta-2,4,7-triene-1,2-dicarboxylate,
diethyl 6-methylcyclohepta-2,4,7-triene-1,2-dicarboxylate,
di-n-propyl 6-methylcyclohepta-2,4,7-triene-1,2-dicarboxylate,
di-n-butyl 6-methylcyclohepta-2,4,7-triene-1,2-dicarboxylate,
di-n-pentyl 6-methylcyclohepta-2,4,7-triene-1,2-dicarboxylate,
di-n-hexyl 6-methylcyclohepta-2,4,7-triene-1,2-dicarboxylate,
diisopropyl 6-methylcyclohepta-2,4,7-triene-1,2-dicarboxylate,
diisobutyl 6-methylcyclohepta-2,4,7-triene-1,2-dicarboxylate,
di(2-ethylhexyl) 6-methylcyclohepta-2,4,7-triene-1,2-dicarboxylate,
dimethyl 6,6-methylcyclohepta-2,4,7-triene-1,2-dicarboxylate,
diethyl 6,6-methylcyclohepta-2,4,7-triene-1,2-dicarboxylate,
di-n-propyl 6,6-methylcyclohepta-2,4,7-triene-1,2-dicarboxylate,
di-n-butyl 6,6-methylcyclohepta-2,4,7-triene-1,2-dicarboxylate,
di-n-pentyl 6,6-methylcyclohepta-2,4,7-triene-1,2-dicarboxylate,
di-n-hexyl 6,6-methylcyclohepta-2,4,7-triene-1,2-dicarboxylate,
diisopropyl 6,6-methylcyclohepta-2,4,7-triene-1,2-dicarboxylate,
diisobutyl 6,6-methylcyclohepta-2,4,7-triene-1,2-dicarboxylate, and
di(2-ethylhexyl) 6,6-methylcyclohepta-2,4,7-triene-1,2-dicarboxylate.

Cyclohepta-1,3,6-triene-1,2-dicarboxylic diester Represented by Formula (V)

dimethyl cyclohepta-1,3,6-triene-1,2-dicarboxylate,
diethyl cyclohepta-1,3,6-triene-1,2-dicarboxylate,
di-n-propyl cyclohepta-1,3,6-triene-1,2-dicarboxylate,
di-n-butyl cyclohepta-1,3,6-triene-1,2-dicarboxylate,
di-n-pentyl cyclohepta-1,3,6-triene-1,2-dicarboxylate,
di-n-hexyl cyclohepta-1,3,6-triene-1,2-dicarboxylate,
diisopropyl cyclohepta-1,3,6-triene-1,2-dicarboxylate,
diisobutyl cyclohepta-1,3,6-triene-1,2-dicarboxylate,
di(2-ethylhexyl)cyclohepta-1,3,6-triene-1,2-dicarboxylate,
dimethyl 4-methylcyclohepta-1,3,6-triene-1,2-dicarboxylate,
diethyl 4-methylcyclohepta-1,3,6-triene-1,2-dicarboxylate,
di-n-propyl 4-methylcyclohepta-1,3,6-triene-1,2-dicarboxylate,
di-n-butyl 4-methylcyclohepta-1,3,6-triene-1,2-dicarboxylate,
di-n-pentyl 4-methylcyclohepta-1,3,6-triene-1,2-dicarboxylate,
di-n-hexyl 4-methylcyclohepta-1,3,6-triene-1,2-dicarboxylate,
diisopropyl 4-methylcyclohepta-1,3,6-triene-1,2-dicarboxylate,
diisobutyl 4-methylcyclohepta-1,3,6-triene-1,2-dicarboxylate,
di(2-ethylhexyl) 4-methylcyclohepta-1,3,6-triene-1,2-dicarboxylate,
dimethyl 5-methylcyclohepta-1,3,6-triene-1,2-dicarboxylate,
diethyl 5-methylcyclohepta-1,3,6-triene-1,2-dicarboxylate,
di-n-propyl 5-methylcyclohepta-1,3,6-triene-1,2-dicarboxylate,
di-n-butyl 5-methylcyclohepta-1,3,6-triene-1,2-dicarboxylate,
di-n-pentyl 5-methylcyclohepta-1,3,6-triene-1,2-dicarboxylate,
di-n-hexyl 5-methylcyclohepta-1,3,6-triene-1,2-dicarboxylate,
diisopropyl 5-methylcyclohepta-1,3,6-triene-1,2-dicarboxylate,
diisobutyl 5-methylcyclohepta-1,3,6-triene-1,2-dicarboxylate,
di(2-ethylhexyl) 5-methylcyclohepta-1,3,6-triene-1,2-dicarboxylate,
dimethyl 6-methylcyclohepta-1,3,6-triene-1,2-dicarboxylate,
diethyl 6-methylcyclohepta-1,3,6-triene-1,2-dicarboxylate,
di-n-propyl 6-methylcyclohepta-1,3,6-triene-1,2-dicarboxylate,
di-n-butyl 6-methylcyclohepta-1,3,6-triene-1,2-dicarboxylate,
di-n-pentyl 6-methylcyclohepta-1,3,6-triene-1,2-dicarboxylate,
di-n-hexyl 6-methylcyclohepta-1,3,6-triene-1,2-dicarboxylate,
diisopropyl 6-methylcyclohepta-1,3,6-triene-1,2-dicarboxylate,
diisobutyl 6-methylcyclohepta-1,3,6-triene-1,2-dicarboxylate,
di(2-ethylhexyl) 6-methylcyclohepta-1,3,6-triene-1,2-dicarboxylate,
dimethyl 5,5-methylcyclohepta-1,3,6-triene-1,2-dicarboxylate,
diethyl 5,5-methylcyclohepta-1,3,6-triene-1,2-dicarboxylate,
di-n-propyl 5,5-methylcyclohepta-1,3,6-triene-1,2-dicarboxylate,
di-n-butyl 5,5-methylcyclohepta-1,3,6-triene-1,2-dicarboxylate,
di-n-pentyl 5,5-methylcyclohepta-1,3,6-triene-1,2-dicarboxylate,
di-n-hexyl 5,5-methylcyclohepta-1,3,6-triene-1,2-dicarboxylate,
diisopropyl 5,5-methylcyclohepta-1,3,6-triene-1,2-dicarboxylate,
diisobutyl 5,5-methylcyclohepta-1,3,6-triene-1,2-dicarboxylate, and di(2-ethylhexyl) 5,5-methylcyclohepta-1,3,6-triene-1,2-dicarboxylate.

Cyclohepta-2,4,6-triene-1,2-dicarboxylic diester Represented by Formula (VI)

dimethyl cyclohepta-2,4,6-triene-1,2-dicarboxylate,
diethyl cyclohepta-2,4,6-triene-1,2-dicarboxylate,
di-n-propyl cyclohepta-2,4,6-triene-1,2-dicarboxylate,
di-n-butyl cyclohepta-2,4,6-triene-1,2-dicarboxylate,
di-n-pentyl cyclohepta-2,4,6-triene-1,2-dicarboxylate,
di-n-hexyl cyclohepta-2,4,6-triene-1,2-dicarboxylate,
diisopropyl cyclohepta-2,4,6-triene-1,2-dicarboxylate,
diisobutyl cyclohepta-2,4,6-triene-1,2-dicarboxylate,
di(2-ethylhexyl)cyclohepta-2,4,6-triene-1,2-dicarboxylate,
dimethyl 4-methylcyclohepta-2,4,6-triene-1,2-dicarboxylate,
diethyl 4-methylcyclohepta-2,4,6-triene-1,2-dicarboxylate,
di-n-propyl 4-methylcyclohepta-2,4,6-triene-1,2-dicarboxylate,
di-n-butyl 4-methylcyclohepta-2,4,6-triene-1,2-dicarboxylate,
di-n-pentyl 4-methylcyclohepta-2,4,6-triene-1,2-dicarboxylate,
di-n-hexyl 4-methylcyclohepta-2,4,6-triene-1,2-dicarboxylate,
diisopropyl 4-methylcyclohepta-2,4,6-triene-1,2-dicarboxylate,
diisobutyl 4-methylcyclohepta-2,4,6-triene-1,2-dicarboxylate,
di(2-ethylhexyl) 4-methylcyclohepta-2,4,6-triene-1,2-dicarboxylate,
dimethyl 5-methylcyclohepta-2,4,6-triene-1,2-dicarboxylate,
diethyl 5-methylcyclohepta-2,4,6-triene-1,2-dicarboxylate,
di-n-propyl 5-methylcyclohepta-2,4,6-triene-1,2-dicarboxylate,
di-n-butyl 5-methylcyclohepta-2,4,6-triene-1,2-dicarboxylate,
di-n-pentyl 5-methylcyclohepta-2,4,6-triene-1,2-dicarboxylate,
di-n-hexyl 5-methylcyclohepta-2,4,6-triene-1,2-dicarboxylate,
diisopropyl 5-methylcyclohepta-2,4,6-triene-1,2-dicarboxylate,
diisobutyl 5-methylcyclohepta-2,4,6-triene-1,2-dicarboxylate,
di(2-ethylhexyl) 5-methylcyclohepta-2,4,6-triene-1,2-dicarboxylate,
dimethyl 6-methylcyclohepta-2,4,6-triene-1,2-dicarboxylate,
diethyl 6-methylcyclohepta-2,4,6-triene-1,2-dicarboxylate,
di-n-propyl 6-methylcyclohepta-2,4,6-triene-1,2-dicarboxylate,
di-n-butyl 6-methylcyclohepta-2,4,6-triene-1,2-dicarboxylate,
di-n-pentyl 6-methylcyclohepta-2,4,6-triene-1,2-dicarboxylate,
di-n-hexyl 6-methylcyclohepta-2,4,6-triene-1,2-dicarboxylate,
diisopropyl 6-methylcyclohepta-2,4,6-triene-1,2-dicarboxylate,
diisobutyl 6-methylcyclohepta-2,4,6-triene-1,2-dicarboxylate,
di(2-ethylhexyl) 6-methylcyclohepta-2,4,6-triene-1,2-dicarboxylate,
dimethyl 4,6-methylcyclohepta-2,4,6-triene-1,2-dicarboxylate,
diethyl 4,6-methylcyclohepta-2,4,6-triene-1,2-dicarboxylate,
di-n-propyl 4,6-methylcyclohepta-2,4,6-triene-1,2-dicarboxylate,
di-n-butyl 4,6-methylcyclohepta-2,4,6-triene-1,2-dicarboxylate,
di-n-pentyl 4,6-methylcyclohepta-2,4,6-triene-1,2-dicarboxylate,
di-n-hexyl 4,6-methylcyclohepta-2,4,6-triene-1,2-dicarboxylate,
diisopropyl 4,6-methylcyclohepta-2,4,6-triene-1,2-dicarboxylate,
diisobutyl 4,6-methylcyclohepta-2,4,6-triene-1,2-dicarboxylate, and
di(2-ethylhexyl) 4,6-methylcyclohepta-2,4,6-triene-1,2-dicarboxylate.

The solid catalyst component in the present invention is not particularly limited in its production process, and examples thereof are above-mentioned catalyst component production processes (1) and (2).

Titanium Compound

The titanium compound in the present invention is not particularly limited, as long as it contains a titanium atom. Specific examples thereof are a titanium tetrahalide such as titanium tetrachloride, titanium tetrabromide and titanium tetraiodide; a tetraalkoxytitanuim such as tetramethoxytitanium, tetraethoxytitanium, tetra-n-propoxytitanium, tetraisopropoxytitanium, tetra-n-butoxytitanium, tetraisobutoxytitanium, and tetracyclohexyloxytitanium; a tetraaryloxytitanium such as tetraphenoxytitanium; an alkoxytitanium trichloride such as methoxytitanium trichloride, ethoxytitanium trichloride, n-propoxytitanium trichloride, n-butoxytitanium trichloride, and ethoxytitanium tribromide; a dialkoxytitanium dihalide such as dimethoxytitanium dichloride, diethoxytitanium dichloride, diisopropoxytitanium dichloride, di-n-propoxytitanium dichloride, and diethoxytitanium dibromide; a trialkoxytitanium monohalide such as trimethoxytitanium chloride, triethoxytitanium chloride, triisopropoxytitanium chloride, tri-n-propoxytitanium chloride, and tri-n-butoxytitanium chloride; and a combination of two or more thereof. Among them, preferred is a titanium tetrahalide or an alkoxytitanium trichloride, more preferred is a titanium tetrahalide, and further preferred is titanium tetrachloride.

Magnesium Compound

The magnesium compound in the present invention is not particularly limited, as long as it contains a magnesium atom. Examples thereof are those represented by following formula (i) or (ii):

$$MgR^1_a X^1_{2-a} \quad (i)$$

$$Mg(OR^1)_a X^1_{2-a} \quad (ii)$$

wherein $R^1$ is a hydrocarbyl group having 1 to 20 carbon atoms, and when plural $R^1$s exist, they are the same as, or different from each other; $X^1$ is a halogen atom, and when plural $X^1$s exist, they are the same as, or different from each other; and a is an integer satisfying $0 \leq a \leq 2$.

Examples of $R^1$ are an alkyl group, an aralkyl group, an aryl group, and an alkenyl group. Those groups may carry a substituent such as a halogen atom, a hydrocarbyloxy group, a nitro group, a sulfonyl group, and a silyl group.

Examples of the alkyl group of $R^1$ are a linear alkyl group such as a methyl group, an ethyl group, a n-propyl group, a n-butyl group, a n-pentyl group, a n-hexyl group, a n-heptyl group, and a n-octyl group; a branched alkyl group such as an isopropyl group, an isobutyl group, a tert-butyl group, an isopenty group, a neopentyl group, and a 2-ethylhexyl group; and a cycloalkyl group such as a cyclopropyl group, a cyclobutyl group, a cyclopentyl group, a cyclohexyl group, a cycloheptyl group, and a cyclooctyl group. Among them, preferred is a linear or branched alkyl group having 1 to 20 carbon atoms.

Examples of the aralkyl group of $R^1$ are a benzyl group and a phenethyl group. Among them, preferred is an aralkyl group having 7 to 20 carbon atoms.

Examples of the aryl group of $R^1$ are a pheny group, a naphthyl group, and a tolyl group. Among them, preferred is an aryl group having 6 to 20 carbon atoms.

Examples of the alkenyl group of $R^1$ are a linear alkenyl group such as a vinyl group, an allyl group, 3-butenyl group, and a 5-hexenyl group; a branched alkenyl group such as an isobutenyl group and a 4-methyl-3-pentenyl group; and a cycloalkenyl group such as 2-cyclohexenyl group and a 3-cyclohexenyl group. Among them, preferred is a linear or branched alkenyl group having 2 to 20 carbon atoms.

Examples of the halogen atom of $X^1$ are a chlorine atom, a bromine atom, an iodine atom, and a fluorine atom. Among them, preferred is a chlorine atom.

Examples of the magnesium compound represented by above formula (i) or (ii) are a dialkylmagnesium such as dimethylmagnesium, diethylmagnesium, diisopropylmagnesium, dibutylmagnesium, dihexylmagnesium, dioctylmagnesium, ethylbutylmagnesium, and butyloctylmagnesium; a dialkoxymagnesium such as dimethoxymagnesium, diethoxymagnesium, dipropoxymagnesium, diisopropoxymagnesium, dibutoxymagnesium, and dioctoxymagnesium; an alkylmagnesium halide such as methylmagnesium chloride, ethylmagnesium chloride, isopropylmagnesium chloride, isobutylmagnesium chloride, tert-butylmagnesium chloride, benzylmagnesium chloride, methylmagnesium bromide, ethylmagnesium bromide, isopropylmagnesium bromide, isobutylmagnesium bromide, tert-butylmagnesium bromide, hexylmagnesium bromide, benzylmagnesium bromide, methylmagnesium iodide, ethylmagnesium iodide, isopropylmagnesium iodide, isobutylmagnesium iodide, tert-butylmagnesium iodide, and benzylmagnesium iodide; an alkoxymagnesium halide such as methoxymagnesium chloride, ethoxymagnesium chloride, propoxymagnesium chloride, isopropoxymagnesium chloride, butoxymagnesium chloride, hexyloxymagnesium chloride, methoxymagnesium bromide, ethoxymagnesium bromide, isopropoxymagnesium bromide, butoxymagnesium bromide, hexyloxymagnesium bromide, methoxymagnesium iodide, ethoxymagnesium iodide, isopropoxymagnesium iodide, butoxymagnesium iodide, hexyloxymagnesium iodide; and a magnesium halide such as magnesium fluoride, magnesium chloride, magnesium bromide, and magnesium iodide.

The magnesium compound is preferably a magnesium halide or a dialkoxymagnesium. The magnesium halide is preferably magnesium chloride. The dialkoxymagnesium is preferably a dialkoxymagnesium having 1 to 20 carbon atoms, further preferably a dialkoxymagnesium having 1 to 10 carbon atoms, and particularly preferably dimethoxymagnesium, diethoxymagnesium, dipropoxymagnesium, diisopropoxymagnesium, or dibutoxymagnesium. Those magnesium compounds may be used in their solid state, or solution state dissolved in a solvent such as an alcohol (for example, methanol, ethanol and 2-ethylhexanol), and a hydrocarbyl solvent (for example, toluene and hexane), and may contain a compound such as an alcohol, an ether and an ester.

The above dialkoxymagnesium can be produced by a process, for example, comprising a step of contacting metal magnesium with alcohol such as methanol, ethanol, propanol, butanol, and octanol, in the presence of a catalyst. Examples of the catalyst are halogen such as iodine, chlorine and bromine; and a magnesium halide such as magnesium iodide and magnesium chloride. Among them, preferred is iodine.

The magnesium compound may be supported on a support (or carrier). The support is not particularly limited in its kind, and examples thereof are a porous inorganic oxide such as $SiO_2$, $Al_2O_3$, MgO, $TiO_2$ and $ZrO_2$; and a porous organic polymer such as polystyrene, poly(styrene-co-divinylbenzene), poly(styrene-co-ethylene glycol dimethacrylate), polymethyl acrylate, polyethyl acrylate, poly(methyl acrylate-co-divinylbenzene), polymethyl methacrylate, poly(methyl methacrylate-co-divinylbenzene), polyacrylonitrile, poly(acrylonitrile-co-divinylbenzene), polyvinyl chloride, polyethylene and polypropylene. Among them, preferred is a porous inorganic oxide, and particularly preferred is $SiO_2$.

In order to support effectively the magnesium compound on a support, the support has a pore volume of preferably 0.3 cm$^3$/g or more, and more preferably 0.4 cm$^3$/g or more, in a pore radius range of 20 to 200 nm, a proportion of which pore volume is preferably 35% or more, and more preferably 40% or more, provided that a proportion of a pore volume in a pore radius range of 3.5 to 7,500 nm is 100%.

The titanium compound in catalyst component production process (1) is used in an amount of usually 0.01 to 100 mol, preferably 0.03 to 50 mol, and particularly preferably 0.05 to 30 mol, per one mol of a magnesium atom contained in the magnesium compound used. The titanium compound is used at one time, or in two or more batches.

The cycloheptapolyenedicarboxylic diester in catalyst component production process (1) is used in an amount of usually 0.01 to 10,000 mL, preferably 0.03 to 5,000 mL, and particularly preferably 0.05 to 3,000 mL, per one gram of the magnesium compound used. The cycloheptapolyenedicarboxylic diester is used at one time, or in two or more batches.

Catalyst component production process (1) is not particularly limited in its method for contacting with one another the titanium compound, the magnesium compound, and the cycloheptapolyenedicarboxylic diester. Examples of the method are those known in the art, such as (1-1) a slurry method, and (1-2) a mechanically pulverizing method using a ball mill.

The above slurry method comprises a step of contacting with one another the titanium compound, the magnesium compound, and the cycloheptapolyenedicarboxylic diester in a slurry state, at a slurry concentration of usually 0.05 to 0.7 g-solid/mL-solvent, and particularly preferably 0.1 to 0.5 g-solid/mL-solvent.

The above mechanically pulverizing method is carried out preferably in the presence of a liquid material, in order to suppress generation of fine powder, which generation results in a solid catalyst component having a too broad particle size distribution. Examples of the liquid material are an aliphatic hydrocarbon such as pentane, hexane, heptane and octane; an aromatic hydrocarbon such as benzene, toluene and xylene; an alicyclic hydrocarbon such as cyclohexane and cyclopentane; and a halogenated hydrocarbon such as 1,2-dichloroethane and monochlorobenzene. Among them, particularly preferred is an aromatic hydrocarbon or a halogenated hydrocarbon.

Catalyst component production process (1) is not particularly limited in its temperature for contacting with one another the titanium compound, the magnesium compound, and the cycloheptapolyenedicarboxylic diester. The contact temperature is usually −50 to 200° C., preferably −20 to 150° C., more preferably −20 to 130° C., and particularly preferably −20 to 120° C.

Catalyst component production process (1) is not particularly limited in its time for contacting with one another the titanium compound, the magnesium compound, and the cycloheptapolyenedicarboxylic diester. The contact time is usually 10 minutes to 12 hours, preferably 30 minutes to 10 hours, and particularly preferably 1 to 8 hours. The contact time is defined as an elapsed time from the beginning of the first contact to the ending of the final contact.

Catalyst component production process (1) is not particularly limited in its embodiment for contacting with one another the titanium compound, the magnesium compound, and the cycloheptapolyenedicarboxylic diester. Examples of the embodiment are (1) an embodiment comprising a step of contacting the total amount of those compounds at one time, and (2) an embodiment comprising steps of dividing those respective compounds to plural parts, and then contacting with one another arbitrary parts of the divided plural parts at an arbitrary order.

Catalyst component production process (1) may use a compound represented by following formula (iii) or (iv) in its contacting step:

  (iii)

  (iv)

wherein $M^1$ is an atom of group 13 or 14; $R^2$ is a hydrocarbyl group having 1 to 20 carbon atoms; $X^2$ is a halogen atom; m is a valence of $M^1$; and c is an integer satisfying $0<c\leq m$.

Examples of the above atom of group 13 of $M^1$ are boron, aluminum, gallium, indium, and thallium. Among them, preferred is boron or aluminum, and more preferred is aluminum. Examples of the above atom of group 14 of $M^1$ are silicon, germanium, tin, and lead. Among them, preferred is silicon, germanium or tin, and more preferred is silicon.

Examples of above $R^2$ are a linear or branched alkyl group such as a methyl group, an ethyl group, a propyl group, an isopropyl group, a butyl group, an isobutyl group, a pentyl group, an isopentyl group, a hexyl group, a heptyl group, an octyl group, a decyl group, and a dodecyl group; a cycloalkyl group such as a cyclohexyl group and a cyclopentyl group; and an aryl group such as a phenyl group, a cresyl group, a xylyl group, and a naphthyl group. Among them, preferred is an alkyl group having 2 to 18 carbon atoms, or an aryl group having 6 to 18 carbon atoms.

Examples of above $X^2$ are a fluorine atom, a chlorine atom, a bromine atom, and an iodine atom. Among them, preferred is a chlorine atom or a bromine atom.

When $M^1$ is an atom of group 13, m is 3, and c is an integer satisfying $0<c\leq 3$, and is preferably 3. When $M^1$ is an atom of group 14, m is 4, and c is an integer satisfying $0<c\leq 4$, and is preferably 3 or 4, and more preferably 4.

A chlorinated aluminum compound and a chlorinated silicon compound represented by the above formulas are preferably ethylaluminum dichloride, ethylaluminum sesquichloride, diethylaluminum chloride, trichloroaluminum, tetrachlorosilane, phenyltrichlorosilane, methyltrichlorosilane, ethyltrichlorosilane, n-propyltrichlorosilane, or p-tolyltrichlorosilane, more preferably a chlorinated compound of a group 14 atom, and particularly preferably tetrachlorosilane or phenyltrichlorosilane.

Catalyst component production process (1) uses an optional compound represented by above formula (iii) or (iv) in an amount of usually 0.01 to 100 mol, preferably 0.03 to 50 mol, and particularly preferably 0.05 to 30 mol, per one mol of a magnesium atom contained in the magnesium compound used. The compound is used at one time, or in two or more batches.

Catalyst component production process (1) is not particularly limited in its temperature for contacting with one another an optional compound represented by above formula (iii) or (iv), the titanium compound, the magnesium compound, and the cycloheptapolyenedicarboxylic diester. The contact temperature is usually −50 to 200° C., preferably −20 to 150° C., more preferably −20 to 130° C., and particularly preferably −20 to 120° C.

Catalyst component production process (1) is not particularly limited in its time for contacting with one another an optional compound represented by above formula (iii) or (iv), the titanium compound, the magnesium compound, and the cycloheptapolyenedicarboxylic diester. The contact time is usually 10 minutes to 12 hours, preferably 30 minutes to 10 hours, and particularly preferably 1 to 8 hours.

Solid Component Containing Titanium Atom and Magnesium Atom

The solid component containing a titanium atom and a magnesium atom in catalyst component production process (2) is not particularly limited, as long as it is a solid containing a titanium atom and a magnesium atom. Examples of the solid component are magnesium titanate; aluminum magnesium titanate disclosed in WO 2004/039747; and a solid catalyst component precursor containing a titanium atom, a magnesium atom and a hydrocarbyloxy group. Among them, preferred is the solid catalyst component precursor. The "solid catalyst component precursor" means a precursor for producing a solid catalyst component, and is hereinafter referred to simply as "precursor".

Examples of the hydrocarbyloxy group contained in the precursor are hydrocarbyloxy groups having 1 to 20 carbon atoms. Among them, preferred is a methoxy group, an ethoxy group, a n-propoxy group, an isopropoxy group, a n-butoxy group, an isobutoxy group, a pentyloxy group, a cyclopentyloxy group, or a cyclohexyloxy group.

The precursor is not particularly restricted in its production process. For example, it can be produced by a process comprising a step of reducing a titanium compound containing a tetravalent titanium atom with an organomagnesium compound in the presence of a silicon compound containing a Si—O bond.

Examples of such a silicon compound are those represented by following formula (v), (vi) or (vii):

  (v)

  (vi)

  (vii)

wherein $R^3$, $R^4$, $R^5$, $R^6$, $R^7$ and $R^8$ are independently of one another a hydrogen atom, or a hydrocarbyl group having 1 to 20 carbon atoms; t is an integer of 1 to 4; u is an integer of 1 to 1,000; and v is an integer of 2 to 1,000.

Examples of the hydrocarbyl group of $R^3$ to $R^8$ are an alkyl group such as a methyl group, an ethyl group, a n-propyl group, an isopropyl group, a n-butyl group, an isobutyl group, a n-pentyl group, an isopentyl group, a hexyl group, a heptyl group, an octyl group, a decyl group, and a dodecy group; an aryl group such as a phenyl group, a cresyl group, a xylyl group, and a naphthyl group; a cycloalkyl group such as a cyclohexyl group and a cyclopentyl group; an alkenyl group such as an allyl group; and an aralkyl group such as a benzyl group. Among them, preferred is an alkyl group having 2 to 18 carbon atoms, or an aryl group having 6 to 18 carbon atoms, and particularly preferred is a linear alkyl group having 2 to 18 carbon atoms.

Examples of the silicon compound represented by above formulas (v) to (vii) are tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane, and phenylhydropolysiloxane. Among them, preferred is a compound represented by formula (v), provided that t is an integer of 1 to 4, more preferred is a tetraalkoxysilane (t=4), and most preferred is tetraethoxysilane.

An example of the above titanium compound containing a tetravalent titanium atom is a compound represented by following formula (viii):

(viii)

wherein $R^9$ is a hydrocarbyl group having 1 to 20 carbon atoms; $X^3$ is a halogen atom, or a hydrocarbyloxy group having 1 to 20 carbon atoms, and when plural $X^3$s exist, they are the same as, or different from one another; and m is an integer of 1 to 20.

Examples of $R^9$ are an alkyl group such as a methyl group, an ethyl group, a n-propyl group, an isopropyl group, a n-butyl group, an isobutyl group, a n-pentyl group, an isopentyl group, a n-hexyl group, a n-heptyl group, a n-octyl group, a n-decyl group, and a n-dodecy group; an aryl group such as a phenyl group, a cresyl group, a xylyl group, and a naphthyl group; a cycloalkyl group such as a cyclohexyl group and a cyclopentyl group; an alkenyl group such as an allyl group; and an aralkyl group such as a benzyl group. Among them, preferred is an alkyl group having 2 to 18 carbon atoms, or an aryl group having 6 to 18 carbon atoms, and particularly preferred is a linear alkyl group having 2 to 18 carbon atoms.

Examples of the halogen atom of $X^3$ are a chlorine atom, a bromine atom, and an iodine atom. Among them, particularly preferred is a chlorine atom.

The hydrocarbyloxy group of $X^3$ is preferably an alkoxy group having 2 to 18 carbon atoms, more preferably an alkoxy group having 2 to 10 carbon atoms, and particularly preferably an alkoxy group having 2 to 6 carbon atoms such as an ethoxy group, an isopropoxy group and a butoxy group.

Examples of the titanium compound represented by above formula (viii) are tetramethoxytitanium, tetraethoxytitanium, tetra-n-propoxytitanium, tetraisopropoxytitanium, tetra-n-butoxytitanium, tetraisobutoxytitanium, n-butoxytitanium trichloride, di-n-butoxytitanium dichloride, tri-n-butoxytitanium chloride, di-n-tetraisopropylpolytitanate (mixture of compounds having "m" of 2 to 10 in above formula (viii)), tetra-n-butylpolytitanate (mixture of compounds baying "m" of 2 to 10 therein), tetra-n-hexylpolytitanate (mixture of compounds having "m" of 2 to 10 therein), and tetra-n-octylpolytitanate (mixture of compounds having "m" of 2 to 10 therein), a condensate obtained by reacting a tetraalkoxytitanium with a small amount of water, and a combination of two or more thereof. Among them, preferred is a titanium compound having "m" of 1, 2 or 4 in formula (viii), and more preferred is tetra-n-butoxytitanium, tetra-n-butyltitanium dimer, or tetra-n-butyltitanium tetramer.

The above organomagnesium compound to produce the precursor is not particularly restricted in its kind, as long as it contains a magnesium-carbon bond (Mg—C bond). Examples thereof are those represented by following formula (ix) or (x), and among them, preferred is a Grignard compound represented by formula (ix) for producing a solid catalyst excellent in its shape, and particularly preferred is an ether solution of a Grignard compound:

(ix)

(x)

wherein $R^{10}$, $R^{11}$ are $R^{12}$ are a hydrocarbyl group having 1 to 20 carbon atoms; and $X^4$ is a halogen atom.

Examples of the above hydrocarbyl group are an alkyl group such as a methyl group, an ethyl group, a n-propyl group, an isopropyl group, a n-butyl group, an isobutyl group, a n-pentyl group, an isopentyl group, a hexyl group, a heptyl group, an octyl group, a decyl group, and a dodecyl group; an aryl group such as a phenyl group, a cresyl group, a xylyl group, and a naphthyl group; a cycloalkyl group such as a cyclohexyl group and a cyclopentyl group; an alkenyl group such as an allyl group; and an aralkyl group such as a benzyl group. Among them, preferred is an alkyl group having 2 to 18 carbon atoms, or an aryl group having 6 to 18 carbon atoms, and particularly preferred is an alkyl group having 2 to 18 carbon atoms.

Examples of above $X^4$ are a chlorine atom, a bromine atom, and an iodine atom. Among them, particularly preferred is a chlorine atom.

Examples of a Grignard compound represented by above formula (ix) are methylmagnesium chloride, ethylmagnesium chloride, n-propylmagnesium chloride, isopropylmagnesium chloride, n-butylmagnesium chloride, isobutylmagnesium chloride, tert-butylmagnesium chloride, n-pentylmagnesium chloride, isopentylmagnesium chloride, cyclopentylmagnesium chloride, n-hexylmagnesium chloride, cyclohexylmagnesium chloride, n-octylmagnesium chloride, 2-ethylhexylmagnesium chloride, phenylmagnesium chloride, and benzylmagnesium chloride. Among them, preferred is ethylmagnesium chloride, n-propylmagnesium chloride, isopropylmagnesium chloride, n-butylmagnesium chloride, or isobutylmagnesium chloride, and particularly preferred is n-butylmagnesium chloride.

Those Grignard compounds are used preferably as an ether solution thereof. Examples of the ether are a dialkyl ether such as diethyl ether, di-n-propyl ether, diisopropyl ether, di-n-butyl ether, diisobutyl ether, ethyl n-butyl ether, and diisopentyl ether; and a cyclic ether such as tetrahydrofuran. Among them, preferred are a dialkyl ether, and particularly preferred is di-n-butyl ether or diisobutyl ether.

The above reduction reaction may be carried out in the presence of an ester compound. The ester compound is not particularly restricted in its kind. Examples thereof are a monocarboxylic acid ester and a polycarboxylic acid ester. Specific examples thereof are a saturated aliphatic carboxylic acid ester, an unsaturated aliphatic carboxylic acid ester, an alicyclic carboxylic acid ester, and an aromatic carboxylic acid ester. More specific examples thereof are methyl acetate, ethyl acetate, phenyl acetate, methyl propionate, ethyl propionate, ethyl butyrate, ethyl valerate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, dipentyl phthalate, di-n-hexyl phthalate, di-n-heptyl phthalate, di-n-octyl phthalate, di(2-ethylhexyl) phthalate, diisodecyl phthalate, dicyclohexyl phthalate, and diphenyl phthalate. Among them, preferred is an aliphatic dicarboxylic acid diester, an aromatic carboxylic acid ester such as ethyl benzoate and butyl benzoate, or an aromatic dicarboxylic acid diester such as a phthalic acid ester.

Examples of a solvent for the above reduction reaction are an aliphatic hydrocarbon such as hexane, heptane, octane, and decane; an aromatic hydrocarbon such as toluene and xylene; an alicyclic hydrocarbon such as cyclohexane, methylcyclohexane and decalin; a dialkyl ether such as diethyl ether, di-n-propyl ether, diisopropyl ether, di-n-butyl ether, diisobutyl ether, ethyl n-butyl ether, and diisopentyl ether; a cyclic ether such as tetrahydrofuran; a halogenated aromatic compound such as chlorobenzene and dichlobenzene; and a combination of two or more thereof. Among them, preferred is an aliphatic hydrocarbon, an aromatic hydrocarbon, or an alicyclic hydrocarbon, more preferred is an aliphatic hydrocarbon or an alicyclic hydrocarbon, further preferred is an aliphatic hydrocarbon, and particularly preferred is hexane or heptane.

The reduction reaction uses the silicon compound in an amount of usually 1 to 500 mol, preferably 1 to 300 mol, and particularly preferably 3 to 100 mol, in terms of a molar amount of a silicon atom contained in the silicon compound used, per one mol of a titanium atom contained in the titanium compound used.

The reduction reaction uses the organomagnesium compound in an amount of usually 0.1 to 10 mol, preferably 0.2 to 5.0 mol, and particularly preferably 0.5 to 2.0 mol, per one mol of the total of a titanium atom contained in the above titanium compound used and a silicon atom contained in the above silicon compound used.

Also, the reduction reaction uses the titanium compound, the silicon compound and the organomagnesium compound in their amount such that an obtained precursor contains a magnesium atom in an amount of usually 1 to 51 mol, preferably 2 to 31 mol, and particularly preferably 4 to 26 mol, per one mol of a titanium atom contained in the precursor.

The reduction reaction uses the ester compound in an amount of usually 0.05 to 100 mol, preferably 0.1 to 60 mol, and particularly preferably 0.2 to 30 mol, per one mol of a titanium atom contained in the titanium compound used.

The organomagnesium compound is added to a solution containing the titanium compound and silicon compound, at usually −50 to 100° C., preferably −30 to 70° C., and particularly preferably −25 to 50° C., over an unrestricted time, usually over about 30 minutes to about 6 hours. The organomagnesium compound is added thereto preferably continuously in order to produce a catalyst excellent in its shape. The obtained reaction mixture may be further heated at 5 to 120° C. to promote the reduction reaction.

The reduction reaction may be carried out in the presence of a support in order to obtain a precursor supported thereon. The support is not particularly limited in its kind, and examples thereof are a porous inorganic oxide such as $SiO_2$, $Al_2O_3$, $MgO$, $TiO_2$ and $ZrO_2$; and a porous organic polymer such as polystyrene, poly(styrene-co-divinylbenzene), poly(styrene-co-ethylene glycol dimethacrylate), polymethyl acrylate, polyethyl acrylate, poly(methyl acrylate-co-divinylbenzene), polymethyl methacrylate, poly(methyl methacrylate-co-divinylbenzene), polyacrylonitrile, poly(acrylonitrile-co-divinylbenzene), polyvinyl chloride, polyethylene and polypropylene.

In order to support effectively a precursor on a support, the support has a pore volume of preferably 0.3 $cm^3/g$ or more, and more preferably 0.4 $cm^3/g$ or more, in a pore radius range of 20 to 200 nm, a proportion of which pore volume is preferably 35% or more, and more preferably 40% or more, provided that a proportion of a pore volume in a pore radius range of 3.5 to 7,500 nm is 100%.

The reduction reaction reduces a tetravalent titanium atom contained in the titanium compound represented by formula (viii) to a trivalent titanium atom. It is preferable in the present invention that substantially all tetravalent titanium atoms contained in the titanium compound are reduced to trivalent titanium atoms. The obtained precursor contains a trivalent titanium atom, a magnesium atom, and a hydrocarbyloxy group, and is generally amorphous or extremely week crystalline, and preferably amorphous.

The obtained precursor may be washed with a solvent. Examples of the solvent are an aliphatic hydrocarbon such as pentane, hexane, heptane, octane and decane; an aromatic hydrocarbon such as benzene, toluene, ethylbenzene and xylene; an alicyclic hydrocarbon such as cyclohexane and cyclopentane; and a halogenated hydrocarbon such as 1,2-dichloroethane and monochlorobenzene. Among them, preferred is an aliphatic hydrocarbon or an aromatic hydrocarbon, more preferred is an aromatic hydrocarbon, and particularly preferred is toluene or xylene.

Catalyst component production process (2) uses the cycloheptapolyenedicarboxylic diester in an amount of usually 0.01 to 10,000 mL, preferably 0.03 to 5,000 mL, and particularly preferably 0.05 to 3,000 mL, per one gram of the solid component (precursor). The cycloheptapolyenedicarboxylic diester is used at one time, or in two or more batches.

Catalyst component production process (2) is not particularly restricted in its contact temperature, which is usually −50 to 200° C., preferably 0 to 170° C., more preferably 50 to 150° C., and particularly preferably 50 to 120° C., and is not particularly restricted in its contact time, which is usually 10 minutes to 12 hours, preferably 30 minutes to 10 hours, and particularly preferably 1 to 8 hours.

Catalyst component production process (2) may use optionally a halogenated metal compound represented by following formula (xi) or (xii) in its contacting step:

  (xi)

  (xii)

wherein $M^2$ is an atom of group 4, 13 or 14; $R^{13}$ is a hydrocarbyl group having 1 to 20 carbon atoms; $X^5$ is a halogen atom; m is a valence of $M^2$; and c is a number satisfying $0<c\leq m$.

Examples of the above atom of group 4 of $M^2$ are titanium, zirconium and hafnium. Among them, preferred is titanium. Examples of the above atom of group 13 of $M^2$ are boron, aluminum, gallium, indium, and thallium. Among them, preferred is boron or aluminum, and more preferred is aluminum. Examples of the above atom of group 14 of $M^2$ are silicon, germanium, tin, and lead. Among them, preferred is silicon, germanium or tin, and more preferred is silicon.

Examples of the above hydrocarbyl group of $R^{13}$ are a linear or branched alkyl group such as a methyl group, an ethyl group, a n-propyl group, an isopropyl group, a n-butyl group, an isobutyl group, a n-pentyl group, an isopentyl group, a hexyl group, a heptyl group, an octyl group, a decyl group, and a dodecyl group; a cycloalkyl group such as a cyclohexyl group and a cyclopentyl group; and an aryl group such as a phenyl group, a cresyl group, a xylyl group, and a naphthyl group.

Examples of above $X^5$ are a fluorine atom, a chlorine atom, a bromine atom, and an iodine atom. Among them, preferred is a chlorine atom or a bromine atom.

When above $M^2$ is an atom of group 4, 13 or 14, m is 4, 3 or 4, respectively. When $M^2$ is an atom of group 4 or 14, above c is an integer satisfying $0<c\leq4$, preferably 3 or 4, and more preferably 4. When $M^2$ is an atom of group 13, c is an integer satisfying $0<c\leq3$, and preferably 3.

Examples of the above halogenated metal compound represented by formula (xi) or (xii) are titanium compounds disclosed in U.S. Pat. No. 6,187,883, and chlorinated compounds of group 13 or 14 disclosed in U.S. Pat. No. 6,903,041.

A halogenated titanium compound of the halogenated metal compound represented by above formula (xi) or (xii) is preferably a titanium tetrahalide such as titanium tetrachloride, titanium tetrabromide and titanium tetraiodide; or an alkoxytitanium trihalide such as methoxytitanium trichloride, ethoxytitanium trichloride, butoxytitanium trichloride, phenoxytitanium trichloride and ethoxytitanium tribromide, more preferably a titanium tetrahalide, and particularly preferably titanium tetrachloride.

A chlorinated compound of an atom of group 13 or 14 of the halogenated metal compound represented by above formula (xi) or (xii) is preferably ethylaluminum dichloride, ethylaluminum sesquichloride, diethylaluminum chloride, trichloaluminum, tetrachlorosilane, phenyltrichlorosilane, methyltrichlorosilane, ethyltrichlorosilane, n-propyltrichlorosilane, or p-tolyltrichlorosilane; more preferably a chlorinated, compound of an atom of group 14; and particularly preferably tetrachlorosilane or phenyltrichlorosilane.

The halogenated metal compound represented by above formula (xi) or (xii) is used in an amount of usually 0.1 to 1,000 mmol, preferably 0.3 to 500 mmol, and particularly preferably 0.5 to 300 mmol, per one gram of the solid component. The halogenated metal compound is used at one time, or in two or more batches.

Catalyst component production process (2) is not particularly limited in its contact time, which is usually 10 minutes to 12 hours, preferably 30 minutes to 10 hours, and particularly preferably 1 to 8 hours.

Catalyst component production process (2) is not particularly limited in its contact method. Examples thereof are those known in the art such as (2-1) a slurry method, and (2-2) a mechanically pulverizing method using a ball mill. The mechanically pulverizing method is carried out preferably in the presence of the above-mentioned liquid material, in order to suppress generation of fine powder, which generation results in a solid catalyst component having a too broad particle size distribution.

The above slurry method (2-1) comprises a step of contacting the solid component containing a titanium atom and a magnesium atom with the cycloheptapolyenedicarboxylic diester in a slurry state, at usually 30 to 150° C., preferably 45 to 135° C., and particularly preferably 60 to 120° C., at a slurry concentration of usually 0.05 to 0.7 g-solid/mL-solvent, and particularly preferably 0.1 to 0.5 g-solid/mL-solvent, for a contact time of preferably about 30 minutes to about 6 hours.

The solid catalyst component in the present invention is reacted with an organoaluminum compound and an optionally-used external electron donor by contacting them with one another according to a contact method known in the art, thereby forming a solid catalyst for olefin polymerization.

Examples of the above organoaluminum compound are those disclosed in U.S. Pat. No. 6,903,041 mentioned above. Among them, preferred is a trialkylaluminum, a mixture of trialkylaluminum with a dialkylaluminum halide, or an alkylalumoxane; and further preferred is triethylaluminum, tri-isobutylaluminum, a mixture of triethylaluminum with diethylaluminum chloride, or tetraethyldialumoxane.

Examples of the above external electron donor are those disclosed in U.S. Pat. No. 6,903,041 mentioned above. Among them, preferred is an oxygen-containing compound or a nitrogen-containing compound. Examples of the oxygen-containing compound are an alkoxysilicon, an ether, an ester and a ketone. Among them, preferred is an alkoxysilicon or an ether.

The above alkoxysilicon is preferably a compound represented by following formula (xiii), (xiv) or (xv):

$$R^{14}_h Si(OR^{15})_{4-h} \quad \text{(xiii)}$$

$$Si(OR^{16})_3(NR^{17}R^{18}) \quad \text{(xiv)}$$

$$Si(OR^{16})_3(NR^{19}) \quad \text{(xv)}$$

wherein $R^{14}$ is a hydrogen atom or a hydrocarbyl group having 1 to 20 carbon atoms; $R^{15}$ is a hydrocarbyl group having 1 to 20 carbon atoms; when plural $R^{14}$s or $R^{15}$s exist, they are the same as, or different from one another; h is an integer satisfying $0 \leq h < 4$; $R^{16}$ is a hydrocarbyl group having 1 to 6 carbon atoms; $R^{17}$ and $R^{18}$ are a hydrogen atom or a hydrocarbyl group having 1 to 12 carbon atoms; and $NR^{19}$ is a cyclic amino group having 5 to 20 carbon atoms, $R^{19}$ being a divalent group.

Examples of the hydrocarbyl group of $R^{14}$ and $R^{15}$ in formula (xiii) are an alkyl group, an aralkyl group, an aryl group, and an alkenyl group. Examples of the alkyl group are a linear alkyl group such as a methyl group, an ethyl group, a n-propyl group, a n-butyl group, a n-pentyl group, a n-hexyl group, a n-heptyl group, and a n-octyl group; a branched alkyl group such as an isopropyl group, an isobutyl group, a tert-butyl group, an isopentyl group, a neopentyl group, and a 2-ethylhexyl group; and a cycloalkyl group such as a cyclopropyl group, a cyclobutyl group, a cyclopentyl group, a cyclohexyl group, a cycloheptyl group, and a cyclooctyl group. Among them, preferred is a linear, branched or cycloalkyl group having 1 to 20 carbon atoms. Examples of the above aralkyl group are a benzyl group and a phenethyl group. Among them, preferred is an aralkyl group having 7 to 20 carbon atoms. Examples of the above aryl group are a pheny group, a tolyl group and a xylyl group. Among them, preferred is an aryl group having 6 to 20 carbon atoms. Examples of the above alkenyl group are a linear alkenyl group such as a vinyl group, an allyl group, 3-butenyl group, and a 5-hexenyl group; a branched alkenyl group such as an isobutenyl group and a 5-methyl-3-pentenyl group; and a cycloalkenyl group such as 2-cyclohexenyl group and a 3-cyclohexenyl group. Among them, preferred is an alkenyl group having 2 to 10 carbon atoms.

Examples of the alkoxysilicon represented by formula (xiii) are cyclohexylmethyldimethoxysilane, cyclohexylethyldimethoxysilane, diisopropyldimethoxysilane, tert-butylethyldimethoxysilane, tert-butyl-n-propyldimethoxysilane, phenyltrimethoxysilane, diphenyldimethoxysilane, dicyclobutyldimethoxysilane, dicyclopentyldimethoxysilane, vinyltriethoxysilane, cyclohexyltriethoxysilane, cyclopentyltriethoxysilane, methyltriethoxysilane, ethyltriethoxysilane, isobutyltriethoxysilane, sec-butyltriethoxysilane, and tetraethoxysilane.

Examples of the hydrocarbyl group of $R^{16}$ in formulas (xiv) and (xv) are an alkyl group and an alkenyl group. Examples of the alkyl group are a linear alkyl group such as a methyl group, an ethyl group, a n-propyl group, a n-butyl group, a n-pentyl group, and a n-hexyl group; a branched alkyl group such as an isopropyl group, an isobutyl group, a tert-butyl group, an isopentyl group, and a neopentyl group; and a cycloalkyl group such as a cyclopropyl group, a cyclobutyl group, a cyclopentyl group, and a cyclohexyl group. Among them, preferred is a linear alkyl group having 1 to 6 carbon atoms. Examples of the above alkenyl group are a linear alkenyl group such as a vinyl group, an allyl group, 3-butenyl group, and a 5-hexenyl group; a branched alkenyl group such as an isobutenyl group and a 5-methyl-3-pentenyl group; and a cycloalkenyl group such as 2-cyclohexenyl group and a 3-cyclohexenyl group. Among them, preferred is a linear alkenyl group having 2 to 6 atoms. $R^{16}$ is particularly preferably a methyl group or an ethyl group.

Examples of the hydrocarbyl group of $R^{17}$ and $R^{18}$ in formula (xiv) are an alkyl group and an alkenyl group. Examples of the alkyl group are a linear alkyl group such as a methyl group, an ethyl group, a n-propyl group, a n-butyl group, a n-pentyl group, and a n-hexyl group; a branched alkyl group such as an isopropyl group, an isobutyl group, a tert-butyl group, an isopentyl group, and a neopentyl group; and a cycloalkyl group such as a cyclopropyl group, a cyclobutyl group, a cyclopentyl group, and a cyclohexyl group. Among them, preferred is a linear alkyl group having 1 to 6 carbon atoms. Examples of the above alkenyl group are a linear alkenyl group such as a vinyl group, an allyl group, 3-butenyl group, and a 5-hexenyl group; a branched alkenyl group such as an isobutenyl group and a 5-methyl-3-pentenyl group; and a cycloalkenyl group such as 2-cyclohexenyl group and a 3-cyclohexenyl group. Among them, preferred is a linear alkenyl group having 2 to 6 atoms. $R^{17}$ and $R^{18}$ are particularly preferably a methyl group or an ethyl group.

Examples of the alkoxysilicon represented by formula are dimethylaminotrimethoxysilane, diethylaminotrimethoxysilane, di-n-propylaminotrimethoxysilane, dimethylaminotriethoxysilane, diethylaminotriethoxysilane, di-n-propylaminotriethoxysilane, methylethylaminotriethoxysilane, methyl-n-propylaminotriethoxysilane, tert-butylaminotriethoxysilane, diisopropylaminotriethoxysilane, and methylisopropylaminotriethoxysilane.

Examples of the cyclic amino group of $NR^{19}$ in formula (xv) are a perhydroquinolino group, a perhydroisoquinolino group, a 1,2,3,4-tetrahydroquinolino group, a 1,2,3,4-tetrahydroisoquinolino group, and an octamethyleneimino group.

Examples of the alkoxysilicon represented by formula (xv) are perhydroquinolinotriethoxysilane, perhydroisoquinolinotriethoxysilane, 1,2,3,4-tetrahydroquinolinotriethoxysilane, 1,2,3,4-tetrahydroisoquinolinotriethoxysilane, and octamethyleneiminotriethoxysilane.

The above ether as the external electron donor is preferably a cyclic ether. The cyclic ether is a heterocyclic compound containing one or more —C—O—C— bonds in its cyclic structure, is preferably a cyclic ether containing one or more —C—O—C—O—C— bonds in its cyclic structure, and is particularly preferably 1,3-dioxolane or 1,3-dioxane.

The above external electron donors are used singly, or in combination of two or more thereof.

The process for producing a solid catalyst of the present invention is not particularly restricted in its method for contacting the solid catalyst component, the organoaluminum compound and the optionally-used external electron donor with one another, as long as a solid catalyst is formed. Such a contact is carried out with or without the use of a solvent. Examples of a method for feeding the solid catalyst component, the organoaluminum compound and the external electron donor to a polymerization reactor are (i) a method comprising steps of contacting all of them with one another to form a contact product, and feeding the contact product to the polymerization reactor, (ii) a method comprising a step of feeding them separately to the polymerization reactor, thereby contacting them with one another in the polymerization reactor, and (iii) a method comprising steps of contacting any two of them with each other to form a contact product, and feeding the contact product and the remaining compound or electron donor separately to the polymerization reactor, thereby contacting them therein with each other.

Examples of the olefin used in the process for producing an olefin polymer of the present invention are ethylene and an α-olefin having three or more carbon atoms. Examples of the α-olefin are a linear mono-olefin such as propylene, 1-butene, 1-pentene, 1-hexene, 1-heptene, 1-octene and 1-decene; a branched mono-olefin such as 3-methyl-1-butene, 3-methyl-1-pentene and 4-methyl-1-pentene; a cyclic mono-olefin such as vinylcyclohexane; and a combination of two or more of those olefins. Among them, preferred is a single application of ethylene or propylene, or a combination of plural olefins containing ethylene or propylene as a major monomer. Such a combination may contain a plural unsaturated bond-carrying compound such as a conjugated diene and an unconjugated diene.

An olefin polymer produced by the process of the present invention is preferably polyethylene; an α-olefin homopolymer such as polypropylene, poly(1-butene), poly(1-pentene), and poly(1-hexene); an ethylene copolymer such as poly(ethylene-co-propylene), poly(ethylene-co-1-butene), and poly(ethylene-co-1-hexene); a propylene copolymer such as poly(propylene-co-1-butene), poly(propylene-co-1-hexene), poly(ethylene-co-propylene-co-1-butene), and poly(ethylene-co-propylene-co-1-hexene); and a so-called impact copolymer produced by a production method comprising steps of (i) polymerizing propylene, thereby producing polypropylene, and (ii) copolymerizing propylene with ethylene in the presence of the polypropylene.

The production process of the solid catalyst in the present invention uses the above-explained solid catalyst component. However, the solid catalyst component can be replaced with the below-explained "pre-polymerized solid catalyst component" in accordance with an intended use.

The pre-polymerized solid catalyst component can be produced by pre-polymerization of a small amount of an olefin in the presence of the above-explained solid catalyst component and the above-explained organoaluminum compound, wherein (i) the term "pre-polymerization" is in contrast to the polymerization in the production process of an olefin polymer of the present invention, which polymerization is referred to as "main polymerization", (ii) the olefin used in the pre-polymerization is the same as, or different from an olefin used in the main polymerization, (iii) the pre-polymerization can use a chain-transfer agent such as hydrogen in order to regulate a molecular weight of a pre-polymerized olefin polymer, (iv) the pre-polymerization can use an external electron donor, and (v) the pre-polymerized solid catalyst component can be considered to be a solid catalyst component whose surface is covered with the pre-polymerized olefin polymer.

Therefore, the term "solid catalyst component" used in the production process of a solid catalyst of the present invention means not only the "solid catalyst component" but also the above-explained "pre-polymerized solid catalyst component" or a combination of those two catalyst components.

The above pre-polymerization is preferably slurry polymerization with the use of an inert hydrocarbon as a solvent, such as propane, butane, isobutane, pentane, isopentane, hexane, heptane, octane, cyclohexane, benzene, and toluene.

The organoaluminum compound in the pre-polymerization is used in an amount of usually 0.5 to 700 mol, preferably 0.8 to 500 mol, and particularly preferably 1 to 200 mol, per one mol of a titanium atom contained in the solid catalyst component used in the pre-polymerization.

The olefin in the pre-polymerization is used in an amount of usually 0.01 to 1,000 g, preferably 0.05 to 500 g, and particularly preferably 0.1 to 200 g, per one gram of the solid catalyst component used in the pre-polymerization.

The pre-polymerization is preferably slurry polymerization, and a concentration of the solid catalyst component in the slurry is preferably 1 to 500 g-solid catalyst component/liter-solvent, and particularly preferably 3 to 300 g-solid catalyst component/liter-solvent.

The pre-polymerization is carried out at preferably −20 to 100° C., and particularly preferably 0 to 80° C., for an unrestricted time, and preferably for 2 minutes to 15 hours, and under a partial pressure of an olefin in a gas phase of preferably 0.01 to 2 MPa, and particularly preferably 0.1 to MPa, provided that an olefin in a liquid state under pre-polymerization temperature and pressure is not limited thereto.

Examples of a method for feeding the solid catalyst component, organoaluminum compound and olefin to a pre-polymerization reactor are (i) a method comprising steps of feeding the solid catalyst component and organoaluminum compound, and then feeding the olefin, and (ii) a method comprising steps of feeding the solid catalyst component and olefin, and then feeding the organoaluminum compound.

Examples of a method for feeding the olefin to a pre-polymerization reactor are (i) a method of feeding the olefin sequentially to the pre-polymerization reactor, so as to keep an inner pressure of the pre-polymerization reactor at a pre-determined level, and (ii) a method of feeding thereto a pre-determined total amount of the olefin at a time.

The external electron donor compound in the pre-polymerization is optionally used in an amount of generally 0.01 to 400 mol, preferably 0.02 to 200 mol, and particularly preferably 0.03 to 100 mol, per one mol of a titanium atom containing in the solid catalyst component used in the pre-polymerization, and is used in an amount of generally 0.003 to 5 mol, preferably 0.005 to 3 mol, and particularly preferably 0.01 to 2 mol, per one mol of the organoaluminum compound used in the pre-polymerization.

Examples of a method for feeding the external electron donor compound to a pre-polymerization reactor are (i) a method of feeding separately the external electron donor compound to the pre-polymerization reactor, and (ii) a method of feeding a contact product of the external electron donor compound with the organoaluminum compound to the pre-polymerization reactor.

Pre-polymerization is disclosed in JP 11-322833A.

The organoaluminum compound in the main polymerization is used in an amount of usually 1 to 1,000 mol, and particularly preferably 5 to 600 mol, per one mol of a titanium atom contained in the solid catalyst component used in the main polymerization.

The external electron donor in the main polymerization is used in an amount of usually 0.1 to 2,000 mol, preferably 0.3 to 1,000 mol, and particularly preferably 0.5 to 800 mol, per one mol of a titanium atom contained in the solid catalyst component used in the main polymerization, or is used in an amount of usually 0.001 to 5 mol, preferably 0.005 to 3 mol, and particularly preferably 0.01 to 1 mol, per one mol of the organoaluminum compound used in the main polymerization.

The main polymerization is carried out batch-wise or continuously, (1) at usually −30 to 300° C., and preferably 20 to 180° C., (2) under a pressure, which is not particularly restricted, of usually atmospheric pressure to 10 MPa, and preferably 200 kPa to 5 MPa, from an industrial and economical point of view, (3) according to (3-1) a slurry or solution polymerization method with the use of an inert hydrocarbon solvent such as propane, butane, isobutane, pentane, hexane, heptane and octane, (3-2) a bulk polymerization method using an olefin as a solvent, which is liquid at polymerization temperature, or (3-3) a gas-phase polymerization method, and (4) with or without the use of a chain transfer agent such as hydrogen and an alkyl zinc (for example, dimethyl zinc and diethyl zinc) in order to control a molecular weight of an olefin polymer produced in the main polymerization.

According to the present invention, there can be provided (1) a solid catalyst component for olefin polymerization which shows a sufficiently-high polymerization activity, (2) a process for producing such a solid catalyst component for olefin polymerization, (3) a process for producing a solid catalyst for olefin polymerization, and (4) a process for producing an olefin polymer.

EXAMPLE

The present invention is explained in more detail with reference to the following Examples, which do not limit the present invention.

The following cycloheptapolyenedicarboxylic diester was produced by a procedure disclosed in Tetrahedron Letters, Vol. 19, pages 1621-1622 (1975), Synthetic Communications, Vol. 31, No. 3, pages 387-393 (2001), and Journal of Organic Chemistry, Vol. 28, page 1459 (1963).

Reference Example 1

Production of diisobutyl acetylenedicarboxylate

To a four-necked one litter flask purged with nitrogen, 25.1 g (0.22 mol) of acetylenedicarboxylic acid, 65.2 g (0.88 mol) of 2-methyl-1-propanol, 2.1 g (0.011 mol) of p-toluenesulfoinic acid, and 376 mL of toluene were charged. The mixture was refluxed for 6 hours while removing by-product water. The reaction mixture was cooled down to room temperature, and was washed two times with a sodium carbonate aqueous solution, and then was further washed two times with water. The organic layer of the washed reaction mixture was dried over anhydrous magnesium sulfate. The dried organic layer was filtered, and volatile matters contained in the obtained liquid were distilled away under reduced pressure, thereby obtaining yellow oil.

The above experiment was repeated using 125.5 g (1.10 mol) of acetylenedicarboxylic acid, 326.1 g (4.40 mol) of 2-methyl-1-propanol, 10.5 g (0.055 mol) of p-toluenesulfoinic acid, and 627 mL of toluene, thereby obtaining yellow oil.

The above former oil and latter oil were collected, and the collected oil was purified by vacuum distillation, thereby obtaining 276.8 g (yield: 90.5%) of diisobutyl acetylenedicarboxylate (colorless oil) with a purity of 97.7% determined by a gas chromatography measurement, its NMR data being shown below:

$^1$H-NMR (CDCl$_3$): δ 0.97 (d, 12H), 1.90-2.10 (m, 2H) and 4.03 (d, 4H); and
$^{13}$C-NMR (CDCl$_3$): δ 18.8, 27.5, 72.8, 74.7 and 151.9.

Reference Example 2

Production of diisobutyl 3-pyrrolylcyclohepta-2,7-diene-1,2-dicarboxylate

To a four-necked two litter flask purged with nitrogen, 122.2 g (890.2 mmol) of 1-(1-cyclopenten-1-yl)pyrrolidine and 540 mL of toluene were charged. The mixture was cooled down to −78° C., and then 207.5 g (890.2 mmol) of diisobutyl acetylenedicarboxylate obtained in Reference Example 1 was added dropwise to the mixture over 50 minutes. The resultant mixture was warmed up to room temperature, and was refluxed for 3 hours. The reaction mixture was cooled down to room temperature, and volatile matters contained therein were distilled away under reduced pressure to obtain a brown solid. The brown solid was washed with hexane, thereby obtaining 265.2 g (yield: 82.0%) of diisobutyl 3-pyrrolylcyclohepta-2,7-diene-1,2-dicarboxylate as a brown solid, its NMR and GCMS data being shown below:
$^1$H-NMR (CDCl$_3$): δ 0.88 (d, 6H), 0.94 (d, 6H), 1.76-2.10 (m, 8H), 2.19 (quintet, 2H), 2.32 (t, 2H), 3.34 (br 4H), 3.76 (d, 2H), 3.87 (d, 2H) and 6.85 (t, 1H);
$^{13}$C-NMR (CDCl$_3$): δ 19.3, 19.4, 25.4, 26.1, 27.7, 27.8, 31.3, 36.2, 51.8, 70.0, 70.9, 95.7, 135.8, 137.2, 161.2, 166.4 and 168.7; and
GCMS m/z: 363(M+).

Reference Example 3

Production of diisobutyl cyclohepta-2,7-diene-1,2-dicarboxylate

To a four-necked two litter flask purged with nitrogen, 165.4 g (455.0 mmol) of diisobutyl 3-pyrrolylcyclohepta-2,7-diene-1,2-dicarboxylate obtained in Reference Example 2 and 1,158 mL of tetrahydrofuran were charged. Thereto, 500.0 mL (containing 455.0 mmol of borane-tetrahydrofuran complex) of a tetrahydrofuran solution (concentration: 0.91M) of a borane-tetrahydrofuran complex was added dropwise over 1.5 hour. The mixture was stirred for 6 hours at room temperature. The reaction mixture was provided with water, and the resultant mixture was subjected to toluene extraction. The extraction liquid was washed with water, and was dried over anhydrous magnesium sulfate. The dried liquid was filtered, and volatile matters contained therein were distilled away under reduced pressure to obtain orange colored oil. The oil was purified with silica-gel column chromatography (developing solvent: mixed solvent of 4 parts by volume of hexane with one part by volume of ethyl acetate), thereby obtaining 105.0 g (yield: 78.0%) of diisobutyl cyclohepta-2,7-diene-1,2-dicarboxylate as pale yellow oil with a purity of 99.6% determined by a gas chromatography measurement, its NMR and GCMS data being shown below:
$^1$H-NMR (CDCl$_3$): δ 0.93 (d, 12H), 1.83-2.01 (m, 2H), 2.11-2.17 (m, 6H), 3.90 (d, 4H) and 7.37 (t, 2H);
$^{13}$C-NMR (CDCl$_3$): δ 19.1, 26.1, 27.7, 34.1, 70.8, 131.7, 144.8 and 166.2; and
GCMS m/z: 294(M+).

Reference Example 4

Production of diisobutyl 3,7-dibromo-1-cycloheptene-1,2-dicarboxylate

To a four-necked one litter flask purged with nitrogen, 73.9 g (250.0 mmol) of diisobutyl cyclohepta-2,7-diene-1,2-dicarboxylate obtained in Reference Example 3 and 554 mL of tetrachloromethane were charged. Thereto, 40.0 g (250.0 mmol) of bromine was added dropwise over 2 hours. The mixture was stirred for 5 hours at room temperature. The reaction mixture was provided with sodium sulfite aqueous solution, and the resultant mixture was separated into an organic layer and an aqueous layer. The organic layer was washed with water, and then with saturated brine, and was dried over anhydrous magnesium sulfate. The dried organic layer was filtered, and volatile matters contained therein were distilled away under reduced pressure, thereby obtaining 121.45 g of yellow oil containing diisobutyl 3,7-dibromo-1-cycloheptene-1,2-dicarboxylate with a purity of 96.3% determined by a gas chromatography measurement, its NMR data being shown below:
$^1$H-NMR (CDCl$_3$): δ 0.96 (d, 12H), 1.87-2.25 (m, 6H), 2.59-2.77 (m, 2H), 3.82 (dd, 2H), 4.09 (dd, 2H) and 5.41 (dd, 2H).

Reference Example 5

Production of isomer mixture of diisobutyl cyclohepta-1,3,6-triene-1,2-dicarboxylate, diisobutyl cyclohepta-2,4,7-triene-1,2-dicarboxylate, and diisobutyl cyclohepta-2,4,6-triene-1,2-dicarboxylate To a four-necked 100 mL flask purged with nitrogen, 2.1 g (4.6 mmol) of diisobutyl 3,7-dibromo-1-cycloheptene-1,2-dicarboxylate obtained in Reference Example 4, 2.8 g (27.4 mmol) of triethylamine, and 25 mL of toluene were charged. The mixture was refluxed for 6 hours. The reaction mixture was cooled down to room temperature, and was washed with a sodium carbonate aqueous solution, and then with saturated brine. The mixture was separated into an organic layer and an aqueous layer. The organic layer was dried over anhydrous magnesium sulfate, and was filtered. Volatile matters contained therein were distilled away under reduced pressure, thereby obtaining 1.3 g of brown colored oil.

The above experiment was repeated two times on respective scales of 23.2 g (50.0 mmol) and 116.1 g (250.0 mmol) of diisobutyl 3,7-dibromo-1-cycloheptene-1,2-dicarboxylate used, thereby obtaining 16.6 g and 84.2 g of brown colored oil, respectively.

The above brown colored oils were all collected, and the collected oil was purified with silica-gel column chromatography (eluent: hexane/ethyl acetate=5/1 (volume/volume)). The purified oil was distilled under reduced pressure, thereby obtaining 63.8 g (yield: 71.7%) of an isomer mixture of diisobutyl cyclohepta-1,3,6-triene-1,2-dicarboxylate, diisobutyl cyclohepta-2,4,7-triene-1,2-dicarboxylate, and diisobutyl cyclohepta-2,4,6-triene-1,2-dicarboxylate (isomer ratio=59:34:7 determined by a gas chromatography measurement), as yellow oil, with an isomer purity of 99.5% determined by a gas chromatography measurement, its NMR and GCMS data being shown below:
$^1$H-NMR (CDCl$_3$): δ 0.96 (d, 12H), 1.92-2.10 (m, 2H), 2.36 (t, 2H), 4.01 (d, 4H), 5.64 (dt, 2H) and 6.47 (d, 2H); and
GCMS m/z: 292 (M+).

Example 1

(1) Production of Solid Catalyst Component
Under nitrogen atmosphese, 10.64 g of spherical diethoxymagnesium, 85 mL of toluene, and 21.3 mL of titanium tetrachloride were loaded into a 300 mL flask equipped with a stirrer, a dropping funnel and a thermometer at room temperature. The mixture was heated up to 80° C., and was provided with 2.13 mL of diisobutyl cyclohepta-2,7-diene-1,2-dicarboxylate obtained in Reference Example 3. The mixture was stirred at 110° C. for 1 hour. The resultant mixture was subjected to solid-liquid separation, and the separated solid was washed at 100° C. three times with each 106 mL of toluene. The washed solid was provided with 85 mL of toluene and 21.3 mL of titanium tetrachloride in this order, and the mixture was stirred at 110° C. for 1 hour. The resultant mixture was subjected to solid-liquid separation, and the separated solid was washed at 100° C. three times with each 106 mL of toluene, and was further washed three times at room temperature with each 106 mL of hexane. The washed solid was dried under reduced pressure, thereby obtaining 10.96 g of a solid catalyst component.

The solid catalyst component was found to contain 2.9% by weight of a titanium atom (Ti), 0.65% by weight of an ethoxy group in terms of an amount of ethanol, and 6.5% by weight of diisobutyl cyclohepta-2,7-diene-1,2-dicarboxylate. Results are shown in Table 1.

(2) Polymerization of propylene

A 3 liter autoclave equipped with a stirrer was dried thoroughly, and was evacuated. To the autoclave, 2.63 mmol of triethylaluminum (organoaluminum compound), 0.26 mmol of cyclohexylethyldimethoxysilane (external electron donor) and 5.28 mg of the above solid catalyst component were added, and then 780 g of propylene and 0.20 MPa of hydrogen were further added. The autoclave was heated up to 80° C., and polymerization was carried out at 80° C. for one hour. Unreacted monomer was purged from the autoclave, thereby obtaining 87.3 g of a propylene polymer. A polymerization activity was calculated to be 16,500 g-polymer/g-solid catalyst component/hr.

The propylene polymer was found to have 5.4% by weight of a cold-xylene soluble part (CXS), and intrinsic viscosity ($[\eta]$) of 0.84 dL/g. Results are shown in Table 1.

The above Ti atom content in the solid catalyst component was measured by the following method comprising the steps of:

(i) decomposing about 20 mg of the solid catalyst component with about 30 mL of 1 mol/L (1M) dilute sulfuric acid;

(ii) adding 3 mL (excess amount) of hydrogen peroxide water having a concentration of 3% by weight thereto, thereby preparing a liquid sample;

(iii) measuring a characteristic absorption of the liquid sample at 410 nm with a double-beam spectrophotometer, U-2001, manufactured by Hitachi, Ltd.; and (iv) determining a Ti atom content (% by weight) using a separately-prepared calibration curve, provided that the total of the solid catalyst component is 100% by weight.

The above alkoxy group content (in case of Example 1, ethoxy group content) in the solid catalyst component was measured as the corresponding alcohol content, by the following method comprising the steps of:

(i) decomposing about 2 g of the solid catalyst component with 100 mL of water to obtain a liquid sample; and (ii) measuring an alcohol amount (% by weight) in the liquid sample by a gas chromatography internal standard method, provided that the total of the solid catalyst component is 100% by weight, wherein the alcohol originates from an alkoxy group contained in the solid catalyst component, namely, ethanol in Examples 1 and 2 originates from an ethoxy group, and 2-ethylhexanol in Examples 3 and 4 originates from a 2-ethylhexoxy group.

The content of the cycloheptapolyenedicarboxylic diester (in case of Example 1, content of diisobutyl cyclohepta-2,7-diene-1,2-dicarboxylate) in the solid catalyst component was measured by the following method comprising the steps of:

(i) dissolving about 300 mg of the solid catalyst component in 100 mL of a mixed solvent consisting of N,N-dimethylacetamide (75 parts by volume) and hexane (25 parts by volume), thereby preparing a solution; and (ii) measuring a content of the cycloheptapolyenedicarboxylic diester (% by weight) using the solution by a gas chromatography internal standard method, provided that the total of the solid catalyst component is 100% by weight, wherein the cycloheptapolyenedicarboxylic diester is diisobutyl cyclohepta-2,7-diene-1,2-dicarboxylate in Examples 1 and 3, and is an isomer mixture of diisobutyl cyclohepta-1,3,6-triene-1,2-dicarboxylate, diisobutyl cyclohepta-2,4,7-triene-1,2-dicarboxylate, and diisobutyl cyclohepta-2,4,6-triene-1,2-dicarboxylate in Examples 2 and 4.

The above CXS, which means an amount of a soluble part in xylene at 20° C., was measured by the following method comprising steps of:

(i) adding 1 g of an olefin polymer to 200 mL of boiling xylene, thereby obtaining a solution;

(ii) cooling the solution slowly down to 50° C.;

(iii) further cooling the solution under stirring down to 25° C. and 20° C. for polypropylene and poly(ethylene-co-1-butene), respectively, by dipping it in an iced water bath;

(iv) keeping the solution at 25° C. and 20° C. for polypropylene and poly(ethylene-co-1-butene), respectively, for three hours, thereby precipitating a polymer;

(v) filtering off the precipitated polymer, thereby obtaining a filtrate;

(vi) distilling away xylene contained in the filtrate to dryness, thereby obtaining a soluble part;

(vii) weighing the soluble part; and (viii) calculating CXS (% by weight) based thereon, provided that the total of the olefin polymer is 100% by weight.

The above intrinsic viscosity ($[\eta]$) was measured at 135° C. using TETRALINE (tetrahydronaphthalene) as a solvent.

Example 2

(1) Production of Solid Catalyst Component

Under nitrogen atmosphere, 5.13 g of spherical diethoxymagnesium, 41 mL of toluene, and 10.3 mL of titanium tetrachloride were added at room temperature into a 200 mL flask equipped with a stirrer, a dropping funnel and a thermometer. The mixture was heated up to 80° C., and was provided with 1.03 mL of an isomer mixture of diisobutyl cyclohepta-1,3,6-triene-1,2-dicarboxylate, diisobutyl cyclohepta-2,4,7-triene-1,2-dicarboxylate, and diisobutyl cyclohepta-2,4,6-triene-1,2-dicarboxylate obtained in Reference Example 5. The mixture was stirred at 110° C. for 1 hour. The resultant mixture was subjected to solid-liquid separation, and the separated solid was washed at 100° C. three times with each 51 mL of toluene. The washed solid was provided with 41 mL of toluene and 10.3 mL of titanium tetrachloride in this order, and the mixture was stirred at 110° C. for 1 hour. The resultant mixture was subjected to solid-liquid separation, and the separated solid was washed at 100° C. three times with each 51 mL of toluene, and was further washed three times at room temperature with each 51 mL of hexane. The washed solid was dried under reduced pressure, thereby obtaining 5.55 g of a solid catalyst component. Results are shown in Table 1.

(2) Polymerization of Propylene

Example 1 (2) was repeated except that 5.28 mg of the solid catalyst component was changed to 5.28 mg of the above-obtained solid catalyst component, thereby obtaining a propylene polymer. Results are shown in Table 1.

Example 3

(1) Production of Solid Catalyst Component

A mixture consisting of 5.21 g of anhydrous magnesium chloride, 26.7 g of decane and 25.5 mL of 2-ethylhexanol was heated at 130° C. for 3 hours under stirring, thereby obtaining a homogeneous solution. To the homogeneous solution, 2.08 mL of diisobutyl cyclohepta-2,7-diene-1,2-dicarboxylate obtained in Reference Example 3 was added, and the mixture was heated at 130° C. for one hour under stirring. The obtained solution was air-cooled down to room temperature. The solution was added dropwise to 130 mL of titanium tetrachloride at −24° C. over 45 minutes under stirring at 200 rpm. The mixture was heated up to 110° C. over 5 hours, and was provided with 0.78 mL of diisobutyl cyclohepta-2,7-diene-1,2-dicarboxylate obtained in Reference Example 3. The mixture was reacted at 110° C. for minutes, and the resultant mixture was subjected to solid-liquid separation. The separated solid was provided with 130 ml of titanium tetrachloride, and the mixture was heated at 110° C. for 35 minutes under stirring. The resultant mixture was subjected to solid-liquid separation, and the separated solid was washed at 100° C. ten times with each 40 mL of decane, and was further washed three times at room temperature with each 40 mL of hexane. The washed solid was dried under reduced pressure, thereby obtaining 7.05 g of a solid catalyst component. Results are shown in Table 1.

(2) Polymerization of Propylene

Example 1 (2) was repeated except that 5.28 mg of the solid catalyst component was changed to 5.28 mg of the above-obtained solid catalyst component, thereby obtaining a propylene polymer. Results are shown in Table 1.

Comparative Example 1

(1) Production of Solid Catalyst Component

Example 1 (1) was repeated except that 2.13 mL of diisobutyl cyclohepta-2,7-diene-1,2-dicarboxylate obtained in Reference Example 3 was changed to 1.04 mL of diethyl trans-4-cyclohexene-1,2-dicarboxylate, thereby obtaining 5.79 g of a solid catalyst component. Results are shown in Table 1.

(2) Polymerization of Propylene

Example 1 (2) was repeated except that 5.28 mg of the solid catalyst component was changed to 5.56 mg of the above-obtained solid catalyst component, thereby obtaining a propylene polymer. Results are shown in Table 1.

TABLE 1

|  | Example | | | Comparative |
| --- | --- | --- | --- | --- |
|  | 1 | 2 | 3 | Example 1 |
| Solid catalyst component | | | | |
| 1. Ti content (% by weight) | 2.9 | 4.2 | 2.5 | 2.8 |
| 2. Alkoxy group content (% by weight) | | | | |
| (1) Ethoxy group (as Ethanol) | 0.65 | 1.05 | | 1.09 |
| (2) 2-Ethylhexoxy group (as 2-Ethylhexanol) | | | 0.19 | |
| 3. Dicarboxylic diesters content (% by weight) | | | | |
| (1) Diisobutyl cyclohepta-2,7-diene-1,2-dicarboxylate | 6.5 | | 6.0 | |
| (2) Isomer mixture | | 7.5 | | |
| (3) Diethyl trans-4-cyclohexene-1,2-dicarboxylate | | | | 11.2 |
| Polymer | | | | |
| 1. Polymerization activity (g-polymer/g-solid catalyst component/hr) | 16,500 | 26,500 | 23,300 | 14,200 |
| 2. CXS (% by weight) | 5.4 | 3.7 | 4.3 | 1.6 |
| 3. [η] (dL/g) | 0.84 | 0.85 | 1.00 | 0.98 |

Example 4

Under nitrogen atmosphere, 188 mL of hexane, 8.9 mL (25 mmol) of tetrabutoxytitanium, and 88.2 mL (395 mmol) of tetraethoxysilane were added into a 500 mL separable flask equipped with a stirrer. While stirring the resultant mixture at 10° C., 204 mL of a di-n-butyl ether solution (concentration: 2.1 mol/L) of n-butylmagnesium chloride was added dropwise to the flask over 4 hours at a constant dropping rate. The mixture was warmed up to 20° C., and then was stirred for 1 hour. The mixture was further warmed up to 35° C., and then was stirred for 2 hours. The reaction mixture was subjected to solid-liquid separation. The separated solid was washed three times with each 280 mL of toluene, and then was dried, thereby obtaining 62 g of a solid catalyst component precursor.

(2) Production of Solid Catalyst Component

The total amount of the above-obtained solid catalyst component precursor was mixed with 160 mL of toluene, thereby preparing toluene slurry of the solid catalyst component precursor. The toluene slurry containing 7.00 g of the solid catalyst component precursor was loaded to a 100 mL flask equipped with a stirrer, a dropping funnel and thermometer under nitrogen atmosphere. The flask was further provided with 14.2 mL of toluene, thereby obtaining slurry having a concentration of 0.20 g-solid catalyst component precursor/mL-toluene. The slurry was heated up to 70° C., and was provided with 5.4 mL (33.8 mmol) of phenyltrichlorosilane and 3.0 mL of diisobutyl cyclohepta-2,7-diene-1,2-dicarboxylate obtained in Reference Example 3. The mixture was stirred at 105° C. for 3 hours, and then was subjected to solid-liquid separation. The separated solid was washed three times with each 30 mL of toluene at 100° C. The washed solid was provided with 20 mL of toluene and 3.5 mL (110 mmol) of titanium tetrachloride, in this order, and then the mixture was stirred at 105° C. for 1 hour. The mixture was subjected to solid-liquid separation. The separated solid was washed six times with each 35 mL of toluene at 100° C., and was further washed two times with each 35 mL of hexane at room temperature. The washed solid was dried under reduced pressure, thereby obtaining 7.7 g of a solid catalyst component having a good particle property. Results are shown in Table 2.

(3) Copolymerization of ethylene with 1-butene

A 3 liter autoclave equipped with a stirrer was dried thoroughly, and was evacuated. To the autoclave, 0.087 MPa of hydrogen, 640 g of butane and 110 g of 1-butene were added and the mixture was heated up to 70° C. Then, ethylene was added thereto in its partial pressure of 0.6 MPa, and then 6.53 mg of the above-obtained solid catalyst component and 5.7 mmol of triethylaluminum were pressed into the autoclave, thereby initiating copolymerization. The copolymerization was carried out at 70° C. for 2 hours under feeding ethylene continuously and keeping the total pressure constant. Unreacted monomers remaining in the autoclave were purged, thereby obtaining 99 g of an ethylene-1-butene copolymer. Results are shown in Table 2.

Comparative Example 2

(1) Production of Solid Catalyst Component

Example 4 (2) was repeated except that 3.0 mL of diisobutyl cyclohepta-2,7-diene-1,2-dicarboxylate was changed to 5.1 mL of di(2-ethylhexyl) phthalate, thereby obtaining 7.0 g of a solid catalyst component. Results are shown in Table 2.

(2) Copolymerization of ethylene with 1-butene

Example 4 (3) was repeated except that 6.53 mg of the solid catalyst component was changed to 20.70 mg of the above-obtained solid catalyst component. Results are shown in Table 2.

Comparative Example 3

(1) Production of Solid Catalyst Component

Example 4 (2) was repeated except that 3.0 mL of diisobutyl cyclohepta-2,7-diene-1,2-dicarboxylate was changed to 5.1 mL of diethyl trans-4-cyclohexene-1,2-dicarboxylate, thereby obtaining 7.5 g of a solid catalyst component. Results are shown in Table 2.

(2) Copolymerization of ethylene with 1-butene

Example 4 (3) was repeated except that 6.53 mg of the solid catalyst component was changed to 7.78 mg of the above-obtained solid catalyst component. Results are shown in Table 2.

TABLE 2

|  | Example | Comparative Example | |
| --- | --- | --- | --- |
|  | 4 | 2 | 3 |
| Solid catalyst component |  |  |  |
| 1. Ti content (% by weight) | 1.92 | 0.96 | 1.41 |
| 2. Alkoxy group content (% by weight) |  |  |  |
| Ethoxy group (as Ethanol) | 0.03 | 1.04 | 2.98 |
| 3. Dicarboxylic diester content (% by weight) |  |  |  |
| (1) Diisobutyl cyclohepta-2,7-diene-1,2-dicarboxylate | 25.1 |  |  |
| (2) Di(2-ethylhexyl) phthalate |  | 26.1 |  |
| (3) Diethyl trans-4-cyclohexene-1,2-dicarboxylate |  |  | 20.6 |
| Polymer |  |  |  |
| 1. Polymerization activity (g-polymer/g-solid catalyst component/hr) | 7,600 | 3,360 | 5,500 |
| 2. CXS (% by weight) | 4.4 | 4.0 | 2.0 |
| 3. SCB (CH$_3$/1,000 C) | 11.3 | 13.9 | 10.2 |
| 4. [η] (dL/g) | 1.74 | 2.15 | 1.93 |

The above short chain branch (SCB) (unit: CH$_3$/1,000 C), which means the number of methyl groups per 1,000 carbon atoms contained in the obtained copolymer, was measured from characteristic absorptions of ethylene units and α-olefin units (1-butene units) assigned in an infrared absorption spectrum measured with an infrared spectrophotometer, FT/IR-470 PLUS, manufactured by Japan Spectroscopic Co., Ltd., using a calibration curve.

The invention claimed is:
1. A solid catalyst component for olefin polymerization comprising a titanium atom, a magnesium atom, a halogen atom, and a cycloheptapolyenedicarboxylic diester,
wherein the cycloheptapolyenedicarboxylic diester is a compound represented by the following formula (I), (II), (III), (IV), (V) or (VI), or a combination of two or more of those compounds:

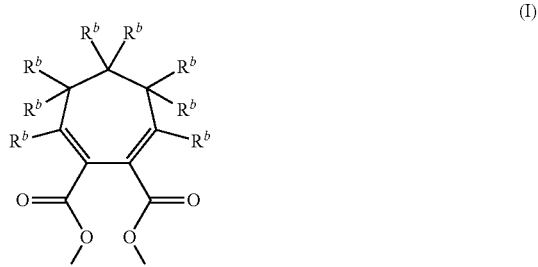

(I)

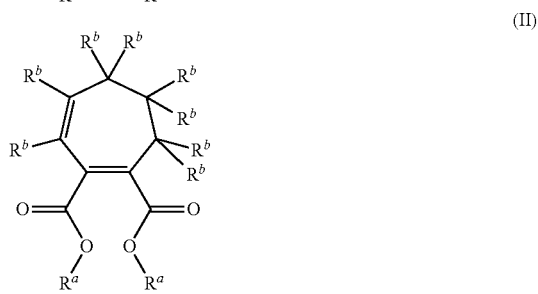

(II)

-continued

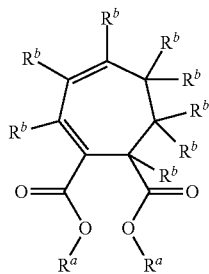

(III)

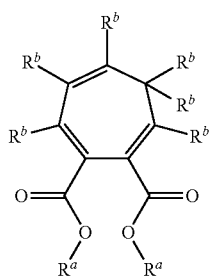

(IV)

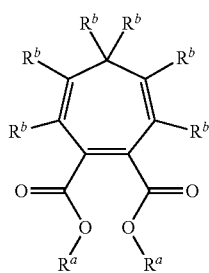

(V)

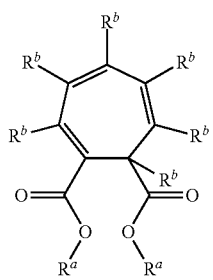

(VI)

wherein $R^a$ is a hydrocarbyl group having 1 to 20 carbon atoms, and respective two $R^a$s are the same as, or different from each other; and $R^b$ is a hydrogen atom, a halogen atom, or a hydrocarbyl group having 1 to 20 carbon atoms, and respective plural $R^b$s are the same as, or different from one another.

2. A process for producing the solid catalyst component according to claim 1, comprising a step of contacting with one another a titanium compound, a magnesium compound, and a cycloheptapolyenedicarboxylic diester.

3. The process according to claim 2, wherein the magnesium compound is a magnesium halide.

4. The process according to claim 2, wherein the magnesium compound is a dialkoxymagnesium.

5. A process for producing the solid catalyst component according to claim 1, comprising a step of contacting a solid component containing a titanium atom and a magnesium atom with a cycloheptapolyenedicarboxylic diester.

6. The process according to claim 5, wherein the solid component is a solid catalyst component precursor containing a titanium atom, a magnesium atom and a hydrocarbyloxy group.

7. The process according to claim 6, wherein the solid catalyst component precursor is produced by a process comprising a step of reducing a titanium compound represented by following formula (viii) with an organomagnesium compound in the presence of a silicon compound containing a Si—O bond:

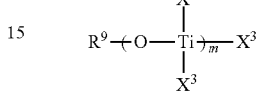

(viii)

wherein $R^9$ is a hydrocarbyl group having 1 to 20 carbon atoms; $X^3$ is a halogen atom, or a hydrocarbyloxy group having 1 to 20 carbon atoms, and plural $X^3$s are the same as, or different from one another; and m is an integer of 1 to 20.

8. A process for producing a solid catalyst for olefin polymerization, comprising a step of contacting with one another the solid catalyst component according to claim 1, an organoaluminum compound, and an optional external electron donor.

9. A process for producing a solid catalyst for olefin polymerization, comprising a step of contacting with one another a solid catalyst component produced by the process according to claim 2, an organoaluminum compound, and an optional external electron donor.

10. A process for producing a solid catalyst for olefin polymerization, comprising a step of contacting with one another a solid catalyst component produced by the process according to claim 5, an organoaluminum compound, and an optional external electron donor.

11. A process for producing an olefin polymer, comprising a step of polymerizing an olefin in the presence of a solid catalyst produced by the process according to claim 8.

12. The process according to claim 11, wherein the olefin is an α-olefin having 3 to 20 carbon atoms.

13. The process according to claim 11, wherein the olefin is a combination of ethylene with one or more α-olefins having 3 to 20 carbon atoms.

14. A process for producing an olefin polymer, comprising a step of polymerizing an olefin in the presence of a solid catalyst produced by the process according to claim 9.

15. The process according to claim 14, wherein the olefin is an α-olefin having 3 to 20 carbon atoms.

16. The process according to claim 14, wherein the olefin is a combination of ethylene with one or more α-olefins having 3 to 20 carbon atoms.

17. A process for producing an olefin polymer, comprising a step of polymerizing an olefin in the presence of a solid catalyst produced by the process according to claim 10.

18. The process according to claim 17, wherein the olefin is an α-olefin having 3 to 20 carbon atoms.

19. The process according to claim 17, wherein the olefin is a combination of ethylene with one or more α-olefins having 3 to 20 carbon atoms.

* * * * *